US011368882B2

(12) United States Patent
Liao et al.

(10) Patent No.: US 11,368,882 B2
(45) Date of Patent: Jun. 21, 2022

(54) DATA TRANSMISSION METHOD, AND RELATED DEVICE AND SYSTEM

(71) Applicant: HUAWEI TECHNOLOGIES CO., LTD., Guangdong (CN)

(72) Inventors: Zilong Liao, Shanghai (CN); Yinghao Jin, Shanghai (CN); Wei Tan, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/672,819

(22) Filed: Nov. 4, 2019

(65) Prior Publication Data
US 2020/0068452 A1    Feb. 27, 2020

Related U.S. Application Data

(63) Continuation of application No. PCT/CN2018/085663, filed on May 4, 2018.

(30) Foreign Application Priority Data

May 5, 2017 (CN) .......................... 201710323435.3

(51) Int. Cl.
*H04W 36/00* (2009.01)
*H04W 76/11* (2018.01)
(Continued)

(52) U.S. Cl.
CPC ......... *H04W 36/0033* (2013.01); *H04W 8/26* (2013.01); *H04W 40/248* (2013.01);
(Continued)

(58) Field of Classification Search
CPC . H04W 36/0033; H04W 76/11; H04W 76/27; H04W 8/26; H04W 40/248; H04W 72/0426; H04W 92/20
See application file for complete search history.

(56) References Cited

U.S. PATENT DOCUMENTS 7,130,285 B2    10/2006  Chang
2015/0173120 A1   6/2015  Yamada
(Continued)

FOREIGN PATENT DOCUMENTS

CN    101043714 A    9/2007
CN    101656992 A    2/2010
(Continued)

OTHER PUBLICATIONS

LTE, 3GPP TS 36.300 version 14.2.0 Release 14 (Year: 2017).*
(Continued)

*Primary Examiner* — Kent Krueger
(74) *Attorney, Agent, or Firm* — Womble Bond Dickinson (US) LLP

(57) ABSTRACT

A data transmission method and a related device and system to improve data transmission efficiency are described. In at least some embodiments, a first message sent by a second base station is received by a first base station. The first message is used to indicate that the second base station needs to transmit data. A second message is sent to the second base station by the first base station. The second message carries at least one address, and the address is associated with the data.

15 Claims, 10 Drawing Sheets

(51) Int. Cl.
*H04W 8/26* (2009.01)
*H04W 76/27* (2018.01)
*H04W 40/24* (2009.01)
*H04W 72/04* (2009.01)
*H04W 92/20* (2009.01)

(52) U.S. Cl.
CPC ........ *H04W 72/0426* (2013.01); *H04W 76/11* (2018.02); *H04W 76/27* (2018.02); *H04W 92/20* (2013.01)

(56) References Cited

U.S. PATENT DOCUMENTS

| | | |
|---|---|---|
| 2015/0373559 A1 | 12/2015 | Hong |
| 2016/0205060 A1 | 7/2016 | Gunnarsson et al. |
| 2017/0006603 A1 | 1/2017 | Chen et al. |
| 2018/0270713 A1* | 9/2018 | Park .................. H04W 74/0833 |
| 2018/0270791 A1* | 9/2018 | Park ........................ H04W 8/24 |
| 2018/0270792 A1* | 9/2018 | Park ..................... H04W 76/28 |
| 2018/0270894 A1* | 9/2018 | Park ..................... H04W 76/27 |
| 2018/0270895 A1* | 9/2018 | Park ........................ H04W 8/18 |
| 2019/0253938 A1* | 8/2019 | Sayenko ........... H04W 36/0069 |
| 2020/0170070 A1* | 5/2020 | Park ..................... H04W 76/27 |

FOREIGN PATENT DOCUMENTS

| | | |
|---|---|---|
| CN | 102497396 A | 6/2012 |
| CN | 104918329 A | 9/2015 |
| CN | 105075314 A | 11/2015 |
| CN | 105637967 A | 6/2016 |
| CN | 105814942 A | 7/2016 |
| CN | 105992293 A | 10/2016 |
| EP | 2645803 A1 | 10/2013 |
| EP | 3029990 A1 | 6/2016 |
| EP | 3573356 A1 | 11/2019 |
| EP | 3611946 A1 | 2/2020 |

OTHER PUBLICATIONS

3GPP TSG RAN WG3 Meeting #95bis,R3-170986:"Handling of data and signalling",CATT,Spokane, Washington, USA, Apr. 3-7, 2017,total 4 pages.
CATT: "Support Data Transmission in Inactive State",3GPP Draft; R2-164807,Aug. 21, 2016 (Aug. 21, 2016)t XP051126516,total 8 pages.
Intel Corporation: "Support of light connection procedure",3GPP Draft; R3-162794,Nov. 14, 2016 (Nov. 14, 2016),XP051178897,total 7 pages.
3GPP TR 38.804 V14.0.0 (Mar. 2017);3rd Generation Partnership Project;Technical Specification Group Radio Access Network;Study on New Radio Access Technology;Radio Interface Protocol Aspects(Release 14);total 57 pages.

* cited by examiner

DATA TRANSMISSION METHOD, AND RELATED DEVICE AND SYSTEM

CROSS-REFERENCE TO RELATED APPLICATIONS

This application is a continuation of International Application No. PCT/CN2018/085663, filed on May 4, 2018, which claims priority to Chinese Patent Application No. 201710323435.3, filed on May 5, 2017. The disclosures of the aforementioned applications are hereby incorporated by reference in their entireties.

TECHNICAL FIELD

Embodiments of the invention relate to the field of communications technologies, and in particular, to a data transmission method, and a related device and system.

BACKGROUND

In a next generation network (5G), three radio resource control (RRC) states are defined for user equipment (UE): an RRC idle state, an RRC inactive state, and an RRC connected state.

When a terminal is in the RRC inactive state, the terminal does not feed back a channel quality status to a network side when moving in a radio access network (RAN) based notification area RNA), and needs to notify the network after moving out of the RNA. The RNA includes one or more cells. If the RNA includes a plurality of cells, the plurality of cells belong to a same base station, or may belong to different base stations. The different base stations may be base stations of a same radio access type (RAT), or may be base stations of different RATs.

Due to mobility of the terminal in the RRC inactive state, the terminal in the RRC inactive state performs downlink synchronization with a new serving base station (e.g., a non-anchor base station or a second base station) through cell reselection. If the terminal in the RRC inactive state needs to transmit downlink data, the terminal first establishes an RRC connection to the new serving base station (e.g., the second base station), then an original anchor base station (e.g., a first base station) before movement transmits the data to the new serving base station through an Xn interface, and then the new serving base station transmits the data to the terminal. If the terminal in the RRC inactive state needs to transmit uplink data, the terminal first transmits the uplink data to the new serving base station, then the new serving base station transmits the uplink data to the anchor base station through the Xn interface, and the anchor base station transmits the uplink data to a core network.

Due to mobility of a terminal in the RRC connected state, the terminal in the RRC connected state is handed over from a source base station (e.g., a first base station) to a target base station (e.g., a second base station) through handover. In the handover process, to ensure a zero-millisecond delay, the terminal in the connected state keeps transmitting data to both the source base station and the target base station in a period of time. In this period of time, the target base station transmits accepted uplink data to the source base station through the Xn interface, and then the source base station transmits the uplink data to the core network.

In the prior art, the first base station and the second base station may transmit data to each other through the Xn interface. However, a specific data communication manner is not provided for the terminal in the RRC inactive state to transmit the data, and the terminal in the RRC connected state to transmit the uplink data in the handover process. In this case, when the first base station and the second base station transmit data to each other, a base station at a transmit end does not know how to identify the to-be-transmitted data. Similarly, the base station at a receive end either does not know data currently sent by the base station at the transmit end. This easily causes communication confusion.

SUMMARY

This application discloses a data transmission method, and a related device and system, to resolve prior-art problems that when a first base station and a second base station transmit data to each other, a base station at a receive end and the base station at a transmit end may do not know how to identify to-be-transmitted data, and do not know data that is currently transmitted. This improves data transmission efficiency.

In at least some embodiments, a data transmission method is provided. The method includes:

receiving, by a first base station, a first message sent by a second base station, where the first message is used to indicate that the second base station needs to transmit data; and sending, by the first base station, a second message to the second base station, where the second message carries at least one address, and the address is associated with the data.

In at least one embodiment, the first message may carry data transmission indication information, and the data transmission indication information is used to indicate that the second base station needs to transmit data to the first base station. After receiving the first message, the first base station may assign at least one address to the to-be-transmitted data of the second base station, and notify the at least one address to the first base station. According to the foregoing solution, when the first base station and the second base station transmit data, the base station at one end knows how to identify the to-be-transmitted data, and the base station at the other end knows data that is currently received. This may improve data transmission efficiency.

In some possible embodiments, the address quantity is a quantity of identifiers of the second transmission granularity that is determined by the second base station based on at least one identifier of a first transmission granularity and a mapping relationship between the identifier of the first transmission granularity and an identifier of the second transmission granularity. In at least one embodiment, if the second base station has at least one piece of data of the first transmission granularity (in other words, the at least one identifier of the first transmission granularity) that needs to be transmitted to the first base station, the second base station may determine, based on mapping relationships between identifiers of different transmission granularities, a quantity of actually transmitted identifiers of the second transmission granularity. The mapping relationships are correspondences between data of different transmission granularities, for example, a specific PDU session to which a QoS flow corresponds.

In some possible embodiments, the first message carries at least one identifier of a first transmission granularity and a mapping relationship between the identifier of the first transmission granularity and an identifier of a second transmission granularity, and the identifier of the first transmission granularity is used to identify the data that corresponds to the identifier of the first transmission granularity and that needs to be sent by the second base station to the first base station; and before the sending, by the first base station, a second message to the second base station, the method further includes: determining, by the first base station, a quantity of the identifiers of the second transmission granularity based on the at least one identifier of the first transmission granularity and the mapping relationship between the identifier of the first transmission granularity and the identifier of the second transmission granularity; and assigning, by the first base station based on the quantity of the identifiers of the second transmission granularity, addresses whose quantity is the same as the quantity of the identifiers of the second transmission granularity to the to-be-transmitted data.

In at least one embodiment, the data indication information may be used to indicate that the second base station notifies, by using the first transmission granularity, the first base station of data that is of the first transmission granularity and that currently needs to be transmitted (e.g., the at least one identifier of the first transmission granularity), and further indicate the mapping relationship between the identifier of the first transmission granularity and the identifier of the second transmission granularity. In this case, the first base station may sequentially determine the quantity of the identifiers of the second transmission granularity when the data is actually transmitted based on the second transmission granularity, and assign the addresses whose quantity is the same as the quantity of the identifiers of the second transmission granularity.

By performing the foregoing operations, one address can be assigned to each piece of to-be-transmitted data of the second transmission granularity (e.g., each identifier of the second transmission granularity), to ensure that the data of the second transmission granularity can be identified one by one by using the addresses during actual transmission of the data of the second transmission granularity. This improves efficiency of data transmission between the first base station and the second base station.

In some possible embodiments, the first message carries at least one identifier of a first transmission granularity and a mapping relationship between the identifier of the first transmission granularity and an identifier of a second transmission granularity, and the identifier of the first transmission granularity is used to identify the data that corresponds to the identifier of the first transmission granularity and that needs to be sent by the second base station to the first base station; and before the sending, by the first base station, a second message to the second base station, the method further includes: determining, by the first base station, at least one identifier of the second transmission granularity based on the at least one identifier of the first transmission granularity and the mapping relationship between the identifier of the first transmission granularity and the identifier of the second transmission granularity; and assigning, by the first base station, a corresponding address to each of the at least one identifier of the second transmission granularity, where the second message further carries the identifier that is of the second transmission granularity and that corresponds to each of the at least one address.

In at least one embodiment, after learning of the at least one identifier of the second transmission granularity in the second base station, the first base station may assign one address to each identifier of the second transmission granularity. Different identifiers of the second transmission granularity correspond to different addresses. The first base station not only assigns the address to the to-be-transmitted data in the second base station, but also configures a mapping relationship between the identifier of the second transmission granularity and the address.

By performing the foregoing operations, the address can be assigned to each piece of to-be-transmitted data of the second transmission granularity (e.g., each identifier of the second transmission granularity), to ensure that the data of the second transmission granularity can be identified one by one by using the addresses during actual transmission of the data of the second transmission granularity. This improves the efficiency of data transmission between the first base station and the second base station.

In some possible embodiments, the first message carries at least one identifier of a second transmission granularity, and the identifier of the second transmission granularity is used to identify the data that corresponds to the identifier of the second transmission granularity and that needs to be sent by the second base station to the first base station; and before the sending, by the first base station, a second message to the second base station, the method further includes: assigning, by the first base station, a corresponding address to each of the at least one identifier of the second transmission granularity, where the second message further carries the identifier that is of the second transmission granularity and that corresponds to each of the at least one address, and a quantity of the at least one identifier of the second transmission granularity is the same as a quantity of the at least one address.

By performing the foregoing operations, the address can be assigned to each piece of to-be-transmitted data of the second transmission granularity (e.g., each identifier of the second transmission granularity), to ensure that the data of the second transmission granularity can be identified one by one by using the addresses during actual transmission of the data of the second transmission granularity. This improves the efficiency of data transmission between the first base station and the second base station.

In some possible embodiments, the method further includes: receiving, by the first base station, a third message sent by the second base station, where the third message carries an identifier that is of a second transmission granularity and that corresponds to each of the at least one address.

By implementing the foregoing operations, the first base station may learn of the address corresponding to each to-be-transmitted identifier of the second transmission granularity in the second base station, to ensure that data of the second transmission granularity can be identified one by one by using the addresses during actual transmission of the data of the second transmission granularity. This improves the efficiency of data transmission between the first base station and the second base station.

In at least some embodiments, another data transmission method is provided. The method includes:

sending, by a second base station, a first message to a first base station, where the first message is used to indicate that the second base station needs to transmit data; and receiving a second message sent by the first base station, where the second message carries at least one address, and the address is associated with the data.

In at least one embodiment, the first message may carry data indication information, and the data indication information may be used to indicate that the second base station needs to transmit data. Optionally, the data indication information may be used to indicate data that is of a second transmission granularity or a first transmission granularity and that is to be transmitted by the second base station. According to the foregoing solution, when the first base station and the second base station transmit data, the base station at one end knows how to identify the to-be-transmitted data, and the base station at the other end knows data that is currently received. This may improve data transmission efficiency.

In some possible embodiments, the first message carries an address quantity, and a quantity of the at least one address in the second message is the same as the address quantity in the first message. In at least one embodiment, the address quantity is determined based on a transmission granularity.

In some possible embodiments, the first message carries at least one identifier of a first transmission granularity and a mapping relationship between the identifier of the first transmission granularity and an identifier of a second transmission granularity, and the identifier of the first transmission granularity is used to identify the data that corresponds to the identifier of the first transmission granularity and that needs to be sent by the second base station to the first base station; a quantity of the at least one address in the second message is the same as a quantity of at least one identifier of the second transmission granularity in the first message; and the quantity of the identifiers of the second transmission granularity is determined based on the at least one identifier of the first transmission granularity and the mapping relationship between the identifier of the first transmission granularity and the identifier of the second transmission granularity.

In some possible embodiments, the first message carries at least one identifier of a first transmission granularity and a mapping relationship between the identifier of the first transmission granularity and an identifier of a second transmission granularity, and the identifier of the first transmission granularity is used to identify the data that corresponds to the identifier of the first transmission granularity and that needs to be sent by the second base station to the first base station; the second message further carries an identifier that is of the second transmission granularity and that corresponds to each of the at least one address, and a quantity of the at least one address in the second message is the same as a quantity of the at least one identifier of the first transmission granularity in the first message; and the identifier of the second transmission granularity is determined based on the at least one identifier of the first transmission granularity and the mapping relationship between the identifier of the first transmission granularity and the identifier of the second transmission granularity.

In some possible embodiments, the first message carries at least one identifier of a first transmission granularity and a mapping relationship between the identifier of the first transmission granularity and an identifier of a second transmission granularity, and the identifier of the first transmission granularity is used to identify the data that corresponds to the identifier of the first transmission granularity and that needs to be sent by the second base station to the first base station; the second message further carries an identifier that is of the second transmission granularity and that corresponds to each of the at least one address, and a quantity of the at least one address in the second message is the same as a quantity of at least one identifier of the second transmission granularity in the first message.

In some possible embodiments, the second base station has data that corresponds to the at least one identifier of the second transmission granularity and that needs to be transmitted to the first base station, and the method further includes: assigning, by the second base station, the corresponding identifier of the second transmission granularity to each of the at least one address, where different addresses correspond to different identifiers of the second transmission granularity; and sending, by the second base station, a third message to the first base station, where the third message carries the identifier that is of the second transmission granularity and that corresponds to each of the at least one address.

By performing the foregoing operations, the second base station knows data that is of the second transmission granularity and that is intended to be sent by the second base station to the first base station (e.g., the at least one identifier of the second transmission granularity), and the second base station may assign the corresponding identifier of the second transmission granularity to each of the at least one address in the second message. This can ensure that data of the second transmission granularity can be identified one by one by using the addresses during actual transmission of the data of the second transmission granularity. This improves efficiency of data transmission between the first base station and the second base station.

In at least some embodiments, the first message is used to indicate that the second base station transmits the to-be-transmitted data to the first base station based on the second transmission granularity.

In at least some embodiments, the first message carries the address quantity, and the quantity of the at least one address in the second message is the same as the address quantity in the first message. In at least one embodiment, the first base station assigns addresses whose quantity is the same as the address quantity to the to-be-transmitted data of the second base station.

In at least some embodiments, the address quantity is determined based on a transmission granularity. In at least one embodiment, if the first base station and the second base station actually transmit data by using the second transmission granularity, the address quantity is a quantity of identifiers of the second transmission granularity that is determined by the second base station, that is, a quantity of pieces of data that is of the second transmission granularity and that is actually sent by the second base station to the first base station.

In at least some embodiments, the first transmission granularity or the second transmission granularity includes any one of the following: a quality of service QoS flow, a protocol data unit PDU session, and a data radio bearer DRB.

In at least some embodiments, still another data transmission method is provided. The method includes:

sending, by a first base station, a first message to a second base station, where the first message carries an address corresponding to each of at least one first identifier of a first transmission granularity, and the address is used to identify data that is of the first transmission granularity and that is transmitted between the first base station and the second base station; and receiving a second message sent by the second base station, where the second message carries a second identifier of the first transmission granularity, and the second identifier is one or more of the at least one first identifier.

In some possible embodiments, before the sending, by a first base station, a first message to a second base station, the method further includes: assigning, by the first base station, a corresponding address to each of the at least one first identifier of the first transmission granularity, where different addresses correspond to different first identifiers of the first transmission granularity.

In at least one embodiment, the first identifier or the second identifier of the first transmission granularity may include any one of the following: an identifier of a QoS flow, an identifier of a PDU session, and an identifier of a DRB.

According to the foregoing solution, when the first base station and the second base station transmit data, the base station at one end knows how to identify the to-be-transmitted data, and the base station at the other end knows data that is currently received. This may improve data transmission efficiency.

In at least some embodiments, still another data transmission method is provided. The method includes:

receiving, by a second base station, a first message sent by a first base station, where the first message carries an address corresponding to each of at least one first identifier of a first transmission granularity, and the address is used to identify data that is of the first transmission granularity and that is transmitted between the first base station and the second base station; and sending, by the second base station, a second message to the first base station, where the second message carries a second identifier of the first transmission granularity, and the second identifier is one or more of the at least one first identifier.

In some embodiments, after the receiving, by a second base station, a first message sent by a first base station, and before the sending, by the second base station, a second message to the first base station, the method further includes: selecting, by the second base station, the second identifier from the first identifier of the first transmission granularity based on information about an air interface resource. In at least one embodiment, the information about the air interface resource may include information about a time-frequency resource of an air interface, and the like.

According to the foregoing solution, when the first base station and the second base station transmit data, the base station at one end knows how to identify the to-be-transmitted data, and the base station at the other end knows data that is currently received. This may improve data transmission efficiency.

In at least some embodiments, the first transmission granularity may include any one of the following: a quality of service QoS flow, a protocol data unit PDU session, and a data radio bearer DRB.

In at least some embodiments, a first base station is provided. The first base station includes a functional unit configured to perform the methods as described herein.

In at least some embodiments, a second base station is provided. The second base station includes a functional unit configured to perform the methods as described herein.

In at least some embodiments, a first base station is provided. The first base station includes a memory, a communications interface, and a processor coupled with the memory and the communications interface, where the memory is configured to store an instruction, the processor is configured to execute the instruction, the communications interface is configured to communicate, under control of the processor, with another device, and when executing the instruction, the processor performs the methods as described herein.

In at least some embodiments, a second base station is provided. The second base station includes a memory, a communications interface, and a processor coupled with the memory and the communications interface, where the memory is configured to store an instruction, the processor is configured to execute the instruction, the communications interface is configured to communicate, under control of the processor, with another device, and when executing the instruction, the processor performs the methods as described herein.

In at least some embodiments, a data transmission system is provided. The data transmission system includes a first base station and a second base station, where the first base station may be the first base station as described herein, and the second base station may be the second base station as described herein.

In at least some embodiments, a computer-readable storage medium is provided. The computer-readable storage medium stores program code used for task processing. The program code includes an instruction used to perform the methods as described herein.

According to the embodiments as described herein, prior-art problems that when the first base station and the second base station transmit data, a base station at one end does not know how to identify the to-be-transmitted data, and the base station at the other end does not know data that is currently received can be resolved. This improves data transmission efficiency.

BRIEF DESCRIPTION OF DRAWINGS

To describe technical solutions in the embodiments of the invention or in the prior art more clearly, accompanying drawings required for describing the embodiments or the prior art are briefly described below.

DESCRIPTION OF EMBODIMENTS

Technical solutions in embodiments of the invention are described in detail with reference to the accompanying drawings below.

Figure 1:
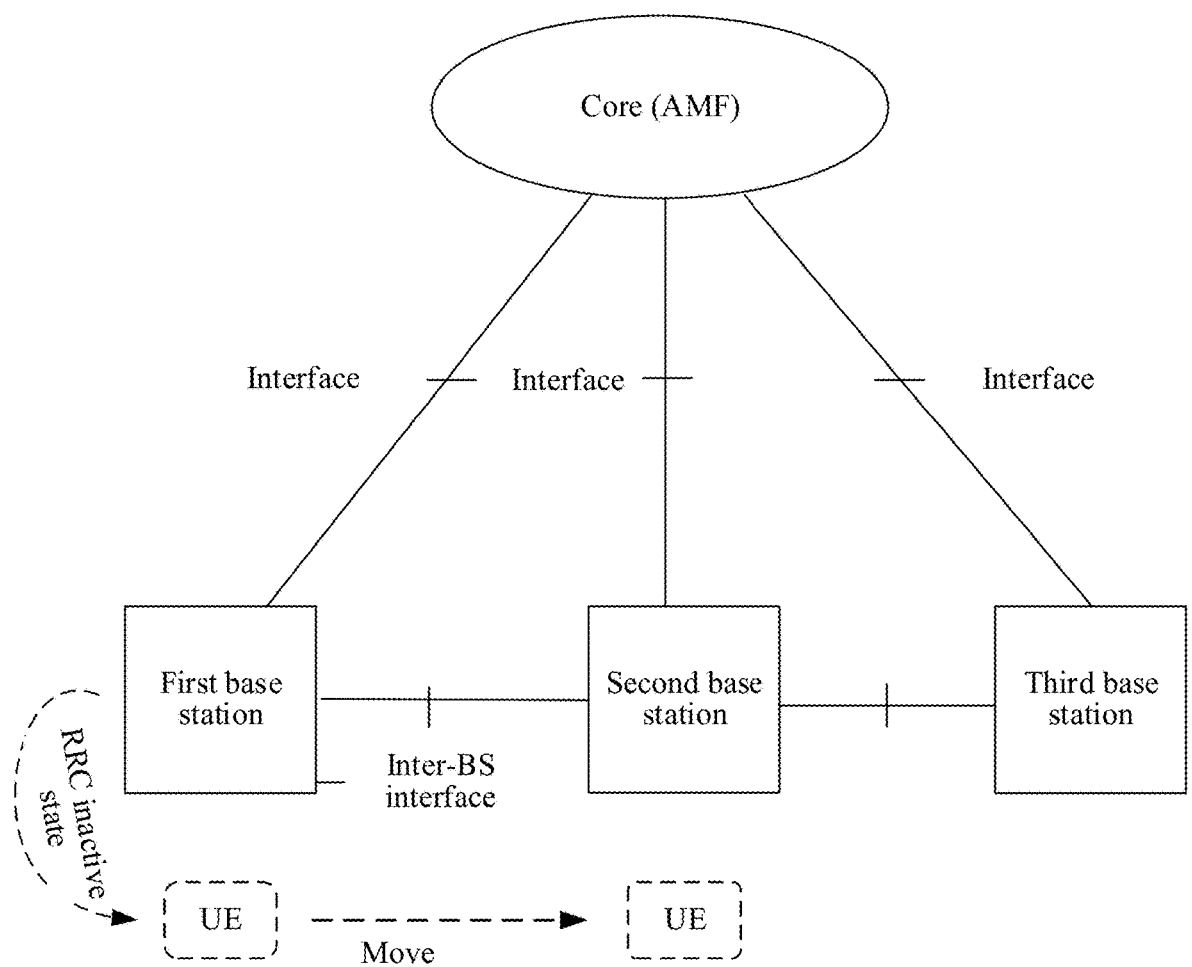
FIG. 1 is a schematic diagram of a network framework according to an embodiment of the invention.

FIG. 1 is a schematic diagram of a network framework according to an embodiment of the invention. The schematic diagram of the network framework includes a core network, a first base station, a second base station, and a user terminal (UE). Optionally, the schematic diagram of the network framework may further include another base station, such as a third base station shown in the figure.

In some embodiments, after the UE establishes an RRC connection to the first base station and a terminal is in an RRC connected state, if the terminal moves from coverage of the first base station to that of the second base station due to mobility of the terminal, and the first base station determines to hand over the terminal to the second base station, the first base station is a source base station, and the second base station is a target base station.

Optionally, after the UE establishes the RRC connection to the first base station and the terminal is in the RRC connected state, if the terminal has no data to be transmitted within a period of time, the first base station switches a state of the terminal from the RRC connected state to an RRC inactive state in a state switching process. In this case, both the terminal and the first base station reserve same (or some) terminal context information as that in the connected state. However, the terminal in the RRC inactive state does not need to report measurement information, for example, channel quality feedback information, to a network side in real time.

If the terminal in the RRC inactive state moves from the coverage of the first base station to that of the second base station, to maintain downlink synchronization with the second base station (or a cell belonging to the second base station), and needs to interact with a network within the coverage of the second base station, for example, needs to transmit uplink data or perform an RNA update, the first base station is an anchor base station (Anchor gNodeB, AgNB), and the second base station is a serving base station (New gNodeB, NgNB) of the terminal in the RRC inactive state.

The terminal context information in the RRC connected state may include information such as capability information of the terminal and bearer configuration information of the terminal. This is not limited in an embodiment of the invention.

The serving base station is a new base station to which the UE is handed over when the UE in the RRC inactive state performs cell movement from the anchor base station, in other words, a base station in which the UE is currently located. The UE and the serving base station may communicate with each other. For example, the UE may receive a broadcast message sent by the serving base station, and the UE may further communicate and interact with the network side (the core network) by using the serving base station.

The core network may include an access and mobility management function (AMF) network element. The AMF network element is a core network control plane network element, and provides a mobility management function and an access management function of a user (UE).

In some embodiments, the first base station, the second base station, and the third base station each may be a 3G NodeB (NodeB), a 4G eNodeB (eNodeB, for example, an eLTE eNodeB), or a 5G gNodeB (gNodeB). This is not limited in an embodiment of the invention.

The eLTE eNodeB (e.g., the 4G eNodeB) is an evolved UMTS terrestrial radio access network (E-UTRAN eNodeB) that supports a connection to a 5G core network. The eLTE eNodeB may support an RRC connected state, an RRC inactive state, and the like of a terminal UE.

As shown in FIG. 1, when the UE is in the RRC inactive state, the base station, the core network, and the terminal UE all reserve corresponding terminal context information, and the base station and the core network each reserve a corresponding connection for the terminal. For an example, when the UE switches the state from the RRC inactive state to the RRC connected state, a communications link between the base station (for example, the anchor base station AgNB) and the core network control plane network element (for example, the AMF network element) does not need to be reactivated.

In some embodiments, the first base station, the second base station, and the third base station each may perform mutual data communication with the core network through an interface between the base station and the core network. The first base station and the second base station may perform mutual data communication through an inter-base station (Inter-BS) interface (for example, an Xn interface).

In at least one embodiment, if the serving base station NgNB has uplink data that needs to be transmitted to the network side, the NgNB may transmit the uplink data to the anchor base station AgNB through the Xn interface, and the AgNB transmits the uplink data to the core network. If the core network has downlink data that needs to be transmitted to the anchor base station AgNB, the core network may send the downlink data to the anchor base station AgNB, and the anchor base station sends the downlink data to the serving base station NgNB through the Xn interface.

Figure 2:
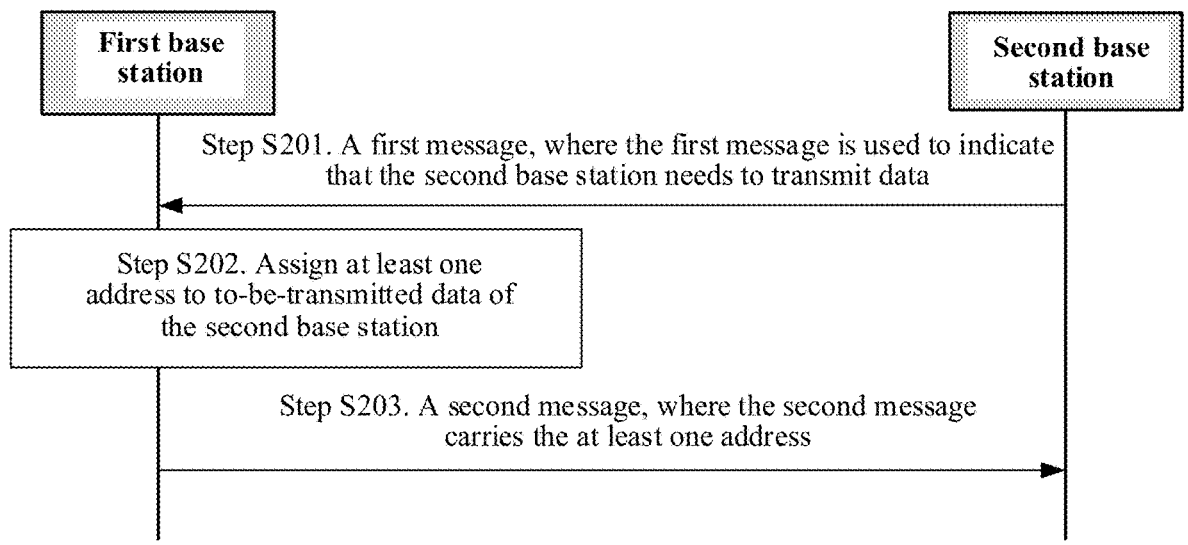
FIG. 2 is a schematic flowchart of a data transmission method according to an embodiment of the invention.

Based on the schematic diagram of the network framework shown in FIG. 1, FIG. 2 shows a data transmission method according to an embodiment of the invention. The method includes the following operations.

In this application, a terminal UE in an RRC inactive state sends data to a first base station, and due to mobility of the terminal, the terminal moves from the first base station to a second base station. If data needs to be transmitted between the terminal and a core network, mutual data communication may be performed by using a communications link from the terminal to the second base station to the first base station to the core network. Therefore, during actual data communication between the first base station and the second base station, the second base station needs to obtain address information corresponding to the first base station, for transmitting data by the second base station through an interface (for example, an Xn interface) between the base stations.

Operation S201. The second base station sends a first message to the first base station, where the first message is used to indicate that the second base station needs to transmit data. Correspondingly, the first base station receives the first message.

In some embodiments, the first message may indicate that at least one piece of data of a first transmission granularity needs to be transmitted from the first base station to the second base station through the interface (for example, the Xn interface) between the base stations. The first transmission granularity may be a quality of service flow (QoS Flow), a protocol data unit session (PDU session), or a data radio bearer (DRB). In other words, the first message may carry at least one identifier of the first transmission granularity, for example, a flow 1 or a session 1. The identifier of the first transmission granularity is used to identify data that is of the first transmission granularity and that currently needs to be transmitted by the second base station from the first base station to the second base station through the interface between the base stations.

In at least one embodiment, the first message may indicate a specific QoS flow whose data needs to be transmitted, a specific DRB whose data needs to be transmitted, or a specific PDU session whose data needs to be transmitted.

Optionally, the first message may further include information such as a quantity of addresses that the first base station expects the second base station to assign, and mapping relationships between data of different transmission granularities. The description is provided herein in the following embodiment.

Operation S202. The first base station assigns at least one address to to-be-transmitted data of the second base station, where the address is associated with the data.

In this application, the first base station may assign, by using a second transmission granularity, the at least one address to the to-be-transmitted data of the second base station. For the second transmission granularity, refer to related descriptions of the first transmission granularity in the foregoing embodiment. Details are not described herein.

In at least one embodiment, the assigned address may be used to identify a QoS flow transmitted through the Xn interface, for an example, the first base station may identify, by using the address, a QoS flow to which a data packet received from the Xn interface belongs. Alternatively, the assigned address may be used to identify a DRB transmitted through the Xn interface, for an example, the first base station may identify, by using the address, a DRB to which a data packet received from the Xn interface belongs. The assigned address may alternatively be used to identify a PDU session transmitted through the Xn interface, for an example, the first base station may identify, by using the address, a PDU session to which a data packet received from the Xn interface belongs.

In some embodiments, the address may be an internet protocol address (IP Address), and may be used for data transmission in an Xn interface data plane. Optionally, a tunnel endpoint identifier, for example, a tunnel endpoint identifier of a general packet radio service tunneling protocol (GPRS Tunneling Protocol, GTP), may further be added to the address, for data transmission in a data plane between a base station at a receive end and a base station at a transmit end. The base station at the receive end and the base station at the transmit end may identify, by using the address (which may also include the tunnel endpoint identifier and is uniformly referred to as an address in this case), a session, a data radio bearer, or a flow that needs to be transmitted through an interface (for example, the Xn interface) between the base stations. Therefore, the address may be used for uplink or downlink data transmission through the interface (for example, the Xn interface) between the base stations.

It should be noted that the address in an embodiment of the invention may not only include the internet protocol address, but also include the tunnel endpoint identifier, or another address used for data transmission through the interface between the base stations. This is not limited in the embodiment of the invention.

Operation S203. The first base station sends a second message to the second base station, where the second message carries the at least one address. Correspondingly, the second base station receives the second message.

In at least one embodiment, the first base station notifies, in a form of the second message, the first base station of the at least one address assigned to the to-be-transmitted data.

In some embodiments, the second message may further carry an identifier that is of the second transmission granularity and that corresponds to each of the at least one address. In other words, the second message carries a binding/mapping relationship (one-to-one mapping) between each identifier of the second transmission granularity and each address. One address corresponds to one identifier of the second transmission granularity. For an example, an address is used to identify data that is of a specific second transmission granularity and that is sent by the second base station to the first base station through the interface between the base stations, e.g., used to identify a specific second transmission granularity (for example, a QoS flow) whose data needs to be transmitted through the interface (for example, the Xn interface) between the base stations.

In operation S201, the first message may further be used to indicate that the second base station transmits the data to the first base station based on the second transmission granularity. When the second base station and the first base station communicate with each other, because it is specified in a protocol that the base station at the transmit end and the base station at the receive end know a transmission granularity used in actual communication, it is assumed that the transmission granularity is the second transmission granularity. In this case, the second base station may notify, without using the first message, the first base station of the second transmission granularity used in actual communication.

The second transmission granularity may refer to a transmission unit used when the second base station actually sends the to-be-transmitted data to the first base station. The first transmission granularity may refer to a transmission unit corresponding to to-be-transmitted data that is notified by the second base station to the first base station. For related descriptions of the first transmission granularity and the second transmission granularity, refer to the related descriptions in the foregoing embodiment. Details are not described herein again.

In some embodiments, the first message may further be used to indicate that at least one piece of data of the second transmission granularity in the second base station needs to be transmitted from the first base station to the second base station through the interface (for example, the Xn interface) between the base stations. In other words, the first message may further carry at least one identifier of the second transmission granularity, and the identifier of the second transmission granularity is used to identify a specific second transmission granularity (such as a PDU session) that needs to be used by the second base station to transmit the data from the first base station to the second base station.

In operation S202, each of the at least one address is used to identify different data or data flows that is/are in the form of the second transmission granularity and that is/are in the to-be-transmitted data. In other words, different addresses are used to identify different data or data flows that is/are of the second transmission granularity and that is/are in the to-be-transmitted data. For example, an address 1 is used to identify a data flow that is in the to-be-transmitted data and that has a session granularity, for example, the session 1 on which data transmission needs to be performed.

In an implementation of operation S202, if the first message carries an address quantity, for an example, if the first message is used to indicate/notify the second base station of a quantity of addresses that need to be assigned by the first base station (that is, the address quantity), the first base station may assign addresses whose quantity is the same as the address quantity to the to-be-transmitted data.

In some embodiments, the address quantity may be determined based on a transmission granularity. Optionally, the address quantity is a quantity of identifiers of the second transmission granularity that is determined by the second base station based on the at least one identifier of the first transmission granularity and a mapping relationship between the identifier of the first transmission granularity and the identifier of the first transmission granularity. In other words, the address quantity is a quantity, determined by the second base station, of at least one piece of data that is of the second transmission granularity and that the second base station intends to send to the first base station.

The mapping relationship between the identifier of the first transmission granularity and the identifier of the second transmission granularity may be understood as a mapping relationship between each piece of data of the second transmission granularity and each piece of data of the first transmission granularity. For example, the second base station establishes three sessions sessions for transmitting data, and the data is data of a session 1 to data of a session 3. Data of three flows flows is established below the data of the session 1: data of a flow 1 to data of a flow 3. Data of three flows flows is established below the data of the session 2: data of a flow 4 to data of a flow 6. Data of four flows flows is established below the data of the session 3: data of a flow 7 to data of a flow 10. The second transmission granularity herein is data of a session session, the first transmission granularity is data of a flow flow, and a mapping relationship between each identifier of the second transmission granularity and each identifier of the first transmission granularity is also described above. For example, data of the session 1 corresponds to the data of three flows: the data of the flow 1 to the data of the flow 3.

For example, it is assumed that there are two flows whose data is intended to be transmitted by the second base station to the first base station, e.g., the flow 2 and the flow 5, and the data is actually transmitted based on a session granularity (that is, the second transmission granularity). The first transmission granularity herein is a flow. The mapping relationship between the identifier of the first transmission granularity and the identifier of the second transmission granularity (that is, the data of the first transmission granularity and the data of the second transmission granularity) is referenced, and the second base station may learn that the flow 2 corresponds to the session 1, and the flow 5 corresponds to the session 2. In other words, the second base station may determine that data of the session 1 and the session 2 needs to be transmitted by the second base station to the first base station. In this case, the second base station also determines that a quantity of sessions sessions that need to be sent by the second base station to the first base station (e.g., the address quantity) is 2.

In some embodiments, the address quantity may be a quantity of pieces of data of the second transmission granularity or a quantity of identifiers of the second transmission granularity when the second base station transmits data to the first base station based on the second transmission granularity.

In another implementation of operation S202, if the first message is used to indicate that the second base station has data to be transmitted to the first base station, the first base station may assign, based on an address quantity set by default, addresses whose quantity is the same as the address quantity to the to-be-transmitted data. Alternatively, the first base station may assign, based on an address quantity carried in another procedure message, addresses whose quantity is the same as the address quantity to the to-be-transmitted data.

In still another implementation of operation S202, if the first message carries the at least one identifier of the second transmission granularity, that is, the first message is used to indicate that the second base station has the at least one identifier of the second transmission granularity whose data needs to be transmitted through the interface between the base stations, the first base station may assign a corresponding address to each of the at least one identifier of the second transmission granularity, and one address corresponds to one identifier of the second transmission granularity. In other words, the first base station may assign a corresponding address to each of the at least one piece of data of the second transmission granularity, and one address corresponds to one piece of data of the second transmission granularity.

Herein, the first base station not only configures the address for each piece of data of the second transmission granularity (e.g., each identifier of the second transmission granularity), but also configures a mapping relationship between the data of the second transmission granularity and the address, for an example, one address corresponds to one identifier of the second transmission granularity.

For example, it is assumed that the second base station notifies, by using the first message, the first base station that the second base station needs to transmit data of the session 1 and the session 3 to the first base station. After receiving the first message, the first base station may configure a corresponding address for each of the session 1 and the session 2, and it is assumed that the addresses are an address 1 and an address 2. The identifiers of the second transmission granularity herein are the session 1 and the session 2. The address 1 is used to identify the session 1 on which data transmission needs to be performed, and the address 2 is used to identify the session 2 on which data transmission needs to be performed.

In another implementation of operation S102, if the first message carries the at least one identifier of the first transmission granularity, and the mapping relationship between the identifier of the first transmission granularity and the identifier of the second transmission granularity (that is, data of the second transmission granularity to which data of the first transmission granularity belongs). In at least some embodiments, the first message may be used to indicate that the second base station has at least one identifier of a first transmission granularity on which data needs to be transmitted through the interface between the base stations. Optionally, the first message may further be used to indicate that the second base station actually transmits the data to the first base station in the form of the second transmission granularity.

Correspondingly, when the first base station determines that the second base station actually transmits the data to the first base station in the form of the second transmission granularity, the first base station may determine, based on the at least one identifier of the first transmission granularity and the mapping relationship between the identifier of the first transmission granularity and the identifier of the second transmission granularity, at least one corresponding identifier of the second transmission granularity or a quantity of the identifiers of the second transmission granularity.

In a possible implementation, after determining the quantity of identifiers of the second transmission granularity (e.g., the address quantity) corresponding to the at least one identifier of the first transmission granularity, the first base station may assign, to the to-be-transmitted data of the second base station, addresses whose quantity is equal to the quantity of the identifiers of the second transmission granularity.

In another possible implementation, after determining the at least one identifier of the second transmission granularity corresponding to the at least one identifier of the first transmission granularity, the first base station may assign a corresponding address to each of the at least one identifier of the second transmission granularity.

It may be understood that, after learning of the at least one identifier that is of the second transmission granularity and that needs to be sent by the second base station to the first base station (that is, data that is of the second transmission granularity and that is to be transmitted), the first base station may not only correspondingly assign an address to the at least one identifier of the second transmission granularity, and further configure a mapping/binding relationship (one-to-one mapping) between each identifier of the second transmission granularity and each address. That is, one address is used to identify one piece of data of the second transmission granularity, that is, identify one piece of data or one data flow in the form of the second transmission granularity.

For example, it is assumed that the second base station notifies, by using the first message, the first base station that the second base station sends data of two flows, the flow 2 and the flow 5, to the first base station based on a session granularity (e.g., the second transmission granularity). The mapping relationship between the identifier of the first transmission granularity and the identifier of the second transmission granularity in the foregoing example is referenced. After receiving the first message, the first base station may learn that the data of the flow 2 corresponds to the data of the session 1, and the data of the flow 5 corresponds to the data of the session 2. In other words, the first base station may determine that the second base station currently intends to send the data of the session 1 and the data of the session 2 to the first base station. Subsequently, the first base station may assign a corresponding address to the data of each of the session 1 and the session 2, for example, assign the address 1 to the data of the session 1 and assign the address 2 to the data of the session 2. Then, the first base station may notify, by using the second message, the second base station of the address assigned to the identifier of the data of the second transmission granularity in the second base station and the mapping relationship between the identifier of the data of the second transmission granularity and the address (in other words, the data of the session 1 corresponds to the address 1, and the data of the session 2 corresponds to the address 2).

In some embodiments, if the second message in operation S203 carries the at least one address, and does not carry the mapping relationship between the address and the identifier of the data of the second transmission granularity (in other words, the identifier that is of the second transmission granularity and that corresponds to each of the at least one address), after the second base station receives the second message and learns of the at least one address, because the second base station knows data that is of the second transmission granularity (e.g., the at least one identifier of the second transmission granularity) and that is intended to be sent to the first base station by the second base station, the second base station may assign a corresponding address to each of the at least one identifier of the second transmission granularity.

Correspondingly, the second base station may send a third message to the first base station, where the third message carries the identifier that is of the second transmission granularity and that corresponds to each of the at least one address. That is, the second base station notifies, by using the third message, the first base station of the identifier of the second transmission granularity assigned to each of the at least one address.

In some embodiments, the first message may include a paging message, a terminal context response message, a terminal context request message, and the like; the second message may include a terminal context request message, a data transmission address notification message, a terminal context response message, and the like; and the third message may include a data transmission address notification message. Related detailed descriptions are provided in the following embodiments.

In some embodiments, if a quantity of the at least one address is less than a quantity of pieces of to-be-transmitted data of the second transmission granularity in the second base station (e.g., the quantity of identifiers of the second transmission granularity), the second base station may continue to perform the foregoing operations S201 to S203 to obtain at least one address reassigned by the first base station, and repeat the procedure until a quantity of addresses assigned by the first base station is not less than the quantity of pieces of data that is of the second transmission granularity and that is to be transmitted by the transmit end (that is, the quantity of identifiers of the second transmission granularity).

In particular, in operation S202, when the first base station assigns the at least one address based on the address quantity set by default or an address quantity carried in another procedure message, a quantity of the assigned address is likely less than the quantity of identifiers of the second transmission granularity. In this case, the second base station may repeatedly perform operation S201 to operation S203 until the quantity of addresses assigned by the first base station is not less than the quantity of identifiers of the second transmission granularity, so that one address can be correspondingly assigned to each of the at least one identifier of the second transmission granularity.

It should be noted that the addresses assigned by the first base station to the to-be-transmitted data of the second base station (e.g., the at least one identifier of the second transmission granularity) are different from each other.

For example, it is assumed that there are seven sessions whose data is intended to be transmitted by the second base station to the first base station, e.g., the data of the session 1 to data of a session 7. The second base station may send the first message to the first base station, to notify the first base station that the second base station has to-be-transmitted data that needs to be transmitted. After receiving the first message, the first base station may assign, based on the address quantity set by default, addresses having a same quantity as the address quantity, and it is assumed that four addresses are set by default. Four addresses are assigned herein, and it is assumed that the four assigned addresses are the address 1 to an address 4. The first base station may send the second message to the second base station, to notify the second base station of the four assigned addresses. After receiving the second message, the second base station learns that the first base station assigns the four addresses, and a quantity of the addresses is less than a quantity of pieces of the to-be-transmitted data of the sessions (4<7). Therefore, the second base station needs to send the first message to the first base station again, so as to re-obtain four addresses newly assigned by the first base station to the to-be-transmitted data of the sessions of the second base station. It is assumed that the four addresses are an address 5 to an address 8. In this case, the eight addresses are sufficient to be used to be bound to transmit the data of the seven sessions. After the second base station learns of the eight addresses (the address 1 to the address 8) assigned by the first base station, the second base station may assign a corresponding address to the data of each of the seven sessions. It is assumed that the address 1 is correspondingly assigned to the data of the session 1, the address 2 is correspondingly assigned to the data of the session 2, . . . , and the address 7 is correspondingly assigned to the data of the session 7. Optionally, the second base station may further send the third message to the first base station, to notify the first base station of the address assigned to the data of each of the seven sessions.

When actually sending data of a session to the first base station, the second base station may add, before the data of the session, a packet header of an address correspondingly assigned to the data of the session, so as to identify, by using the address, the data of the session corresponding to the address. For example, when actually sending the data of the session 1 to the first base station (specifically, sending the data of the session 1 to the address 1 of the first base station), the second base station may add a packet header of the address 1 before the data of the session 1. In this way, when receiving the data of the session 1, the first base station may learn, by parsing the address 1 in the packet header, that the data of the session 1 corresponding to the address 1 is currently sent by the second base station.

Based on the foregoing embodiments, embodiments of downlink data transmission in the embodiments of the invention are described below. In the downlink data transmission embodiments, the second base station may be an anchor base station (AgNB), and the first base station may be a serving base station (NgNB).

Figure 3:
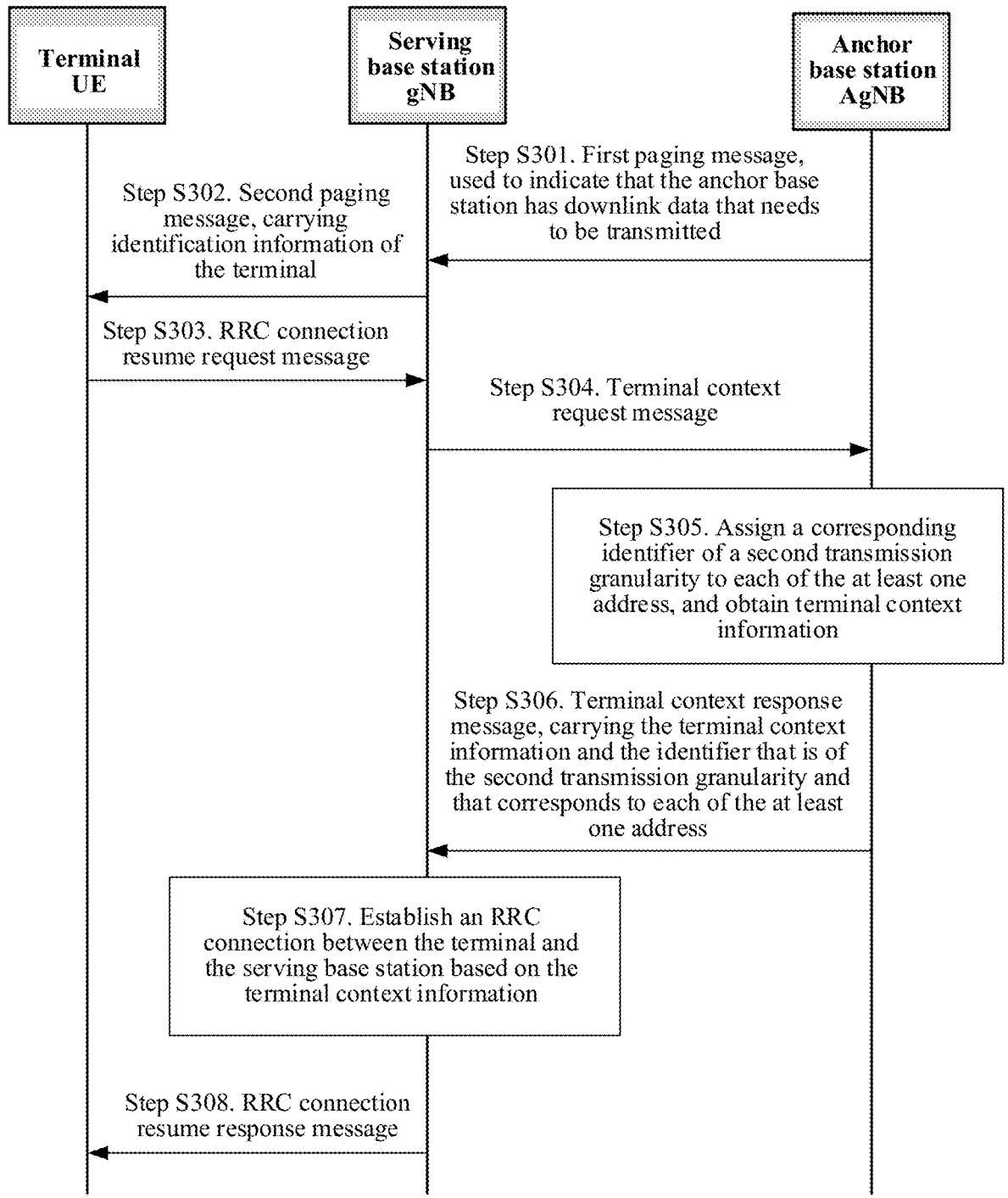
FIG. 3 is a schematic flowchart of a downlink data transmission method according to an embodiment of the invention.
Figure 4:
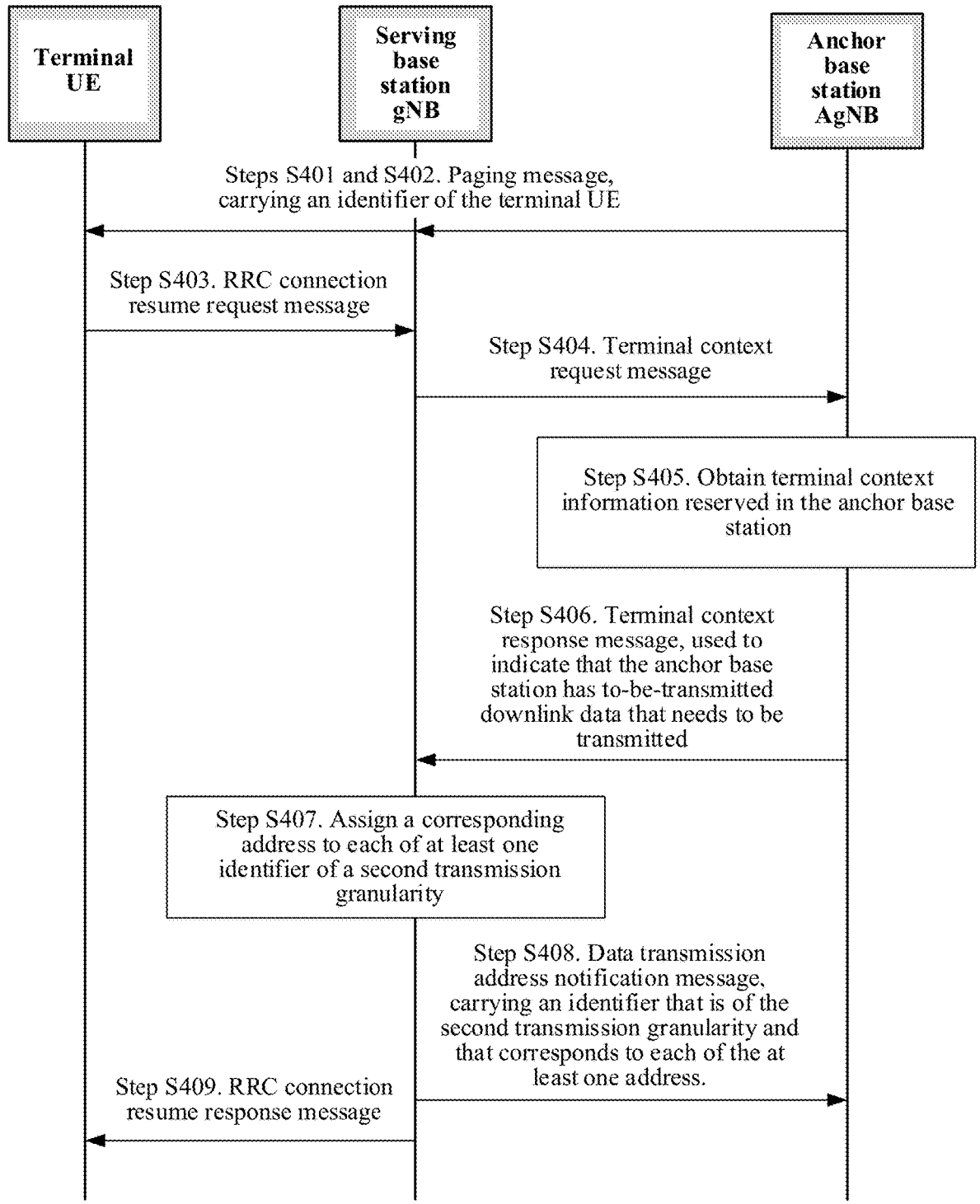
FIG. 4 is a schematic flowchart of another downlink data transmission method according to an embodiment of the invention.

FIG. 3 and FIG. 4 show two downlink data transmission embodiments. FIG. 3 is a schematic flowchart of a downlink data transmission method. The method includes the following operations.

Operation S301. An anchor base station sends a first paging message (paging) to a serving base station, where the paging message carries identification information of a terminal UE, and the identification information may uniquely indicate the terminal in an RNA range. Correspondingly, the serving base station receives the second paging message.

In some embodiments, the first paging message may further carry downlink data indication information, and the downlink data indication information is used to indicate that the anchor base station has to-be-transmitted downlink data of the terminal.

Optionally, the first paging message may further carry address quantity indication information, and the address quantity indication information indicates a quantity of addresses that need to be assigned by the serving base station, so that the anchor base station transmits, to the serving base station through an interface (for example, an Xn interface) between the base stations, the to-be-transmitted downlink data of the terminal reserved by the anchor base station. The to-be-transmitted downlink data of the terminal is also to-be-transmitted data that needs to be sent by the anchor base station to the serving base station through the Xn interface. The first paging message herein may be a representation manner of the first message.

In some embodiments, after receiving the first paging message, the serving base station may learn, through message parsing, that the anchor base station needs to transmit downlink data to the serving base station. In this case, the serving base station may assign at least one address to the to-be-transmitted data of the anchor base station.

Operation S302. The serving base station sends a second paging message to the terminal, where the second paging message carries the identification information of the terminal UE. Correspondingly, the terminal receives the second paging message.

Operation S303. The terminal sends an RRC connection resume request message to the serving base station, where the RRC connection resume request message is used to request to resume an RRC connection between the terminal and the serving base station. Correspondingly, the serving base station receives the RRC connection resume request message.

The RRC connection resume request message carries the identification information of the terminal. The identification information may uniquely indicate the terminal in an RNA area. In this case, the identification information may also be resume identification information, for example, resume ID information.

In at least one embodiment, when the terminal receives the second paging message sent by the serving base station, because the terminal is in an RRC inactive state, the terminal further needs to send the RRC connection resume request message to the serving base station (that is, a base station currently serving the terminal), to establish the RRC connection between the terminal and the serving base station. This facilitates secure data communication between the terminal and the serving base station.

Operation S304. The serving base station sends a terminal context request message (Retrieve UE Context Request) to the anchor base station, where the terminal context request message is used to obtain terminal context information reserved in the anchor base station, and the terminal context request message carries the at least one address. Correspondingly, the anchor base station receives the terminal context request message.

In at least one embodiment, after receiving the RRC connection resume request message, the serving base station finds that the serving base station does not have the terminal context information, and therefore sends the terminal context request message to the anchor base station, to obtain the terminal context information reserved in the anchor base station. In addition, the terminal context request message may carry the at least one address, to notify the anchor base station of the at least one address configured by the serving base station. The terminal context request message herein may be a representation manner of the second message.

Operation S305. The anchor base station assigns a corresponding identifier of a second transmission granularity to each of the at least one address, and obtains the terminal context information reserved in the anchor base station.

In at least one embodiment, after receiving the terminal context request message, the anchor base station may obtain the terminal context information from the anchor base station. In addition, for the anchor base station, the anchor base station knows data that is of a second transmission granularity and that needs to be transmitted to the serving base station (for example, a session 1 and a session 2 on which data transmission needs to be performed). It is assumed that the anchor base station learns that the anchor base station also sends to-be-transmitted data to the serving base station based on the second transmission granularity (for example, a session granularity), and learns of an identifier that is of the second transmission granularity and that corresponds to data currently needing to be transmitted to the serving base station. In this case, the anchor base station may assign, based on the received at least one address, a corresponding identifier of the second transmission granularity to each of the at least one address. One address corresponds to one identifier of the second transmission granularity.

That is, the anchor base station may map each of the at least one address to the at least one identifier of the second transmission granularity in a one-to-one correspondence. In at least one embodiment, the anchor base station determines an address used for a downlink PDU session/DRB/QoS flow transmitted on the Xn interface. For descriptions of the second transmission granularity, refer to the related descriptions in the foregoing embodiment. Details are not described herein again.

Operation S306. The anchor base station sends a terminal context response message (Retrieve UE Context Response) to the serving base station, where the terminal context response message carries the terminal context information and the identifier that is of the second transmission granularity and that corresponds to each of the at least one address. Correspondingly, the serving base station receives the terminal context response message.

In some embodiments, the terminal context response message may carry the at least one identifier of the second transmission granularity, and the identifier of the second transmission granularity is used to indicate/identify data of the second transmission granularity that corresponds to the identifier and that needs to be sent by the anchor base station to the serving base station. The identifier of the second transmission granularity may include any one of the following: an identifier of the PDU session, an identifier of the QoS flow, and an identifier of the DRB.

Optionally, the terminal context response message may further indicate mapping relationships between identifiers of different transmission granularities, for an example, indicate mapping relationships between any two or three of the PDU session, the QoS flow, and the DRB. The mapping relationships include the mapping relationship between the identifier of the first transmission granularity and the identifier of the second transmission granularity. In at least one embodiment, the mapping relationship may indicate a PDU session corresponding to each specific QoS flow, a DRB corresponding to each specific QoS flow, and a PDU session corresponding to each specific DRB. For example, a DRB 1 and a DRB 2 correspond to a PDU session 1, a DRB 3 and a DRB 4 correspond to a PDU session 2, and a QoS flow 1 and a QoS flow 2 correspond to a DRB 3. Therefore, the QoS flow 1 and the QoS flow 2 correspond to the PDU session 2.

Optionally, the terminal context response message may further include the mapping relationship between the address and the identifier of the second transmission granularity in operation S305, and the mapping relationship indicates an address used when downlink data of the PDU session/DRB/QoS flow is transmitted through the Xn interface.

For example, it is assumed that the serving base station assigns three addresses to the to-be-transmitted data of the anchor base station, which are an address 1 to an address 3. The anchor base station learns a session 1, a session 2, and a session 3 on which data needs to be transmitted to the serving base station. After the serving base station notifies the anchor base station of the foregoing three addresses, the anchor base station may bind/map the three addresses to the three sessions. One address corresponds to one session. It is assumed that the anchor base station correspondingly assigns the address 1 to the session 1, correspondingly assigns the address 2 to the session 2, and correspondingly assigns the address 3 to the session 3. Optionally, the anchor base station may notify the serving base station of a binding/mapping relationship between the address and the session.

In at least one embodiment, the anchor base station may add, to the terminal context response message, the obtained terminal context information and the identifier that is of the second transmission granularity and that corresponds to each of the assigned at least one address, so as to notify the anchor base station. The terminal context message herein may be a representation manner of the third message.

Operation S307. The serving base station establishes an RRC connection between the terminal and the serving base station based on the terminal context information.

In at least one embodiment, the serving base station receives the terminal context response message, and may learn, through message parsing, of information such as the terminal context information and the identifier that is of the second transmission granularity and that corresponds to each of the at least one address. The serving base station may establish the RRC connection between the terminal and the serving base station based on the terminal context information.

In some embodiments, the serving base station may store the identifier that is of the second transmission granularity and that corresponds to each of the at least one address, so that when the anchor base station sends data (for example, the data of the session 1) corresponding to the identifier of the second transmission granularity to the serving base station, the serving base station may learn, based on the mapping relationship between the address and the identifier of the second transmission granularity, of data that is of the second transmission granularity and that is currently sent by the anchor base station, in other words, a specific PDU session/DRB/QoS flow used by the anchor base station for data transmission.

For example, referring to the embodiment shown in FIG. 2, the serving base station assigns two addresses to the to-be-transmitted data of the anchor base station, which are the address 1 and the address 2, and notifies the anchor base station by using the terminal context request message. The anchor base station currently needs to send the data of the session 1 and the data of the session 2. After learning of the address 1 and the address 2, the anchor base station may assign an address to the data of each of the session 1 and the session 2, assuming that the address 1 is assigned to the data of the session 1 and the address 2 is assigned to the data of the session 2. In addition, the anchor base station notifies the serving base station of the binding/mapping relationship between the address and the data of the second transmission granularity (the to-be-transmitted data: the data of the session 1 and the data of the session 2) by using the terminal context response message. When the anchor base station actually transmits the two pieces of to-be-transmitted data by using a session granularity, the anchor base station may add a corresponding address before the to-be-transmitted data, to notify the serving base station of the currently transmitted to-be-transmitted data. For example, when transmitting the data of the session 1, the anchor base station may add a packet header of the address 1 before the data of the session 1. When receiving the data that is of the session 1 and that carries the packet header of the address 1, the serving base station may determine, based on a mapping relationship between the address 1 and the data of the session 1, the data of the session 1 that is currently sent by the anchor base station and that corresponds to the address 1. Similarly, the serving base station may determine, based on a mapping relationship between the address 2 and the data of the session 2, the data of the session 2 that is currently sent by the anchor base station and that corresponds to the address 2.

Operation S308. The serving base station sends an RRC connection resume response message (RRC Connection Resume Response) to the terminal UE, to notify that the RRC connection between the terminal and the serving base station is resumed and established.

In at least one embodiment, the serving base station may respond to the RRC connection resume request message, and establish the RRC connection between the UE and the serving base station based on the obtained terminal context information. Subsequently, the serving base station may send the RRC connection resume response message to the terminal UE, to notify the UE that the RRC connection between the UE and the serving base station is resumed and established, so that the UE and the serving base station subsequently perform secure data communication with each other.

In some embodiments, if the first paging message is used to indicate/notify that the anchor base station has to-be-transmitted downlink data needing to be transmitted to the serving base station, after the serving base station receives the first paging message, the serving base station may assign, based on the address quantity set by default or an address quantity carried in another procedure message, addresses whose quantity is the same as the address quantity to the to-be-transmitted data (e.g., the downlink data).

In some embodiments, the first paging message may further carry address quantity indication information, and the address quantity indication information is used to indicate a quantity of addresses that need to be assigned by the serving base station. After learning of the quantity of addresses that need to be assigned, the serving base station may assign, based on the address quantity, addresses whose quantity is the same as the address quantity to the to-be-transmitted data.

In some embodiments, the first paging message may be further used to instruct the anchor base station to send the to-be-transmitted data to the serving base station based on the second transmission granularity, that is, a granularity for data transmission performed by the anchor base station through the Xn interface.

The first transmission granularity and the second transmission granularity may include any one of a QoS flow (flow), a PDU session (session), and a radio bearer DRB.

In some embodiments, the address quantity carried in the first paging message is determined based on a transmission granularity. In at least one embodiment, the address quantity may be determined by the anchor base station based on at least one identifier that is of the first transmission granularity and that currently needs to be transmitted, and the mapping relationship between the identifier of the first transmission granularity and the identifier of the second transmission granularity. For details, refer to related detailed descriptions in the foregoing embodiment. Details are not described herein again.

For example, the mapping relationship between the identifier of the first transmission granularity and the identifier of the second transmission granularity in the embodiment shown in FIG. 2 is referenced. It is assumed that data corresponding to the identifier of the first transmission granularity that the anchor base station intends to transmit is the data of the flow 1, the data of the flow 2, the data of the flow 5, and the data of the flow 7. Based on a mapping relationship between data of a flow and data of a session, the anchor base station may learn that the data of the session 1, the data of the session 2, and the data of the session 3 can be actually transmitted to the serving base station, and also learn that the anchor base station intends to transmit three pieces of data of the session, in other words, the address quantity is 3.

In some embodiments, in operation S203, the serving base station may add the assigned at least one address to the terminal context request message, and transmit the terminal context request message to the anchor base station. Correspondingly, after the anchor base station receives the at least one address, because the anchor base station knows data that is of the second transmission granularity (that is, the at least one identifier of the second transmission granularity, such as the data of the session 1 to the data of the session 3) and that is intended to be sent by the anchor base station to the serving base station, the anchor base station may assign the corresponding identifier of the second transmission granularity to each of the at least one address. Different addresses are used to identify different data or data flows that are in the to-be-transmitted data and that are in a form of the second transmission granularity.

For example, it is assumed that the serving base station assigns three addresses to the to-be-transmitted data of the anchor base station, which are the address 1 to the address 3. The anchor base station learns that the anchor base station needs to send the data of the session 1, the data of the session 2, and the data of the session 3 to the serving base station. After the serving base station notifies the anchor base station of the foregoing three addresses, the anchor base station may bind/map the three addresses to the three sessions. One address corresponds to one piece of data of a session. It is assumed that the anchor base station correspondingly assigns the address 1 to the data of the session 1, correspondingly assigns the address 2 to the data of the session 2, and correspondingly assigns the address 3 to the data of the session 3. Optionally, the anchor base station may notify the serving base station of a binding/mapping relationship between the address and the data of the session.

FIG. 4 is a schematic flowchart of another downlink data transmission method. The method includes the following operations.

Operation S401. An anchor base station sends a first paging message (paging) to a serving base station, where the first paging message carries identification information of a terminal, and the identification information may uniquely indicate the terminal in an RNA range. Correspondingly, the serving base station receives the second paging message.

Operation S402. The serving base station sends a second paging message to the terminal, where the second paging message carries the identification information of the terminal.

In at least one embodiment, the anchor base station may send the first paging message to the serving base station through an Xn interface. The serving base station may forward the second paging message to the terminal UE through a common channel. Both the first paging message and the second paging message are used to request to look for/search for a terminal corresponding to the identification information. In some embodiments, the first paging message and the second paging message may be a same message.

Operation S403. The terminal sends an RRC connection resume request message (RRC Connection Resume Request) to the serving base station, where the RRC connection resume request message is used to request to resume an RRC connection between the terminal and the serving base station. Correspondingly, the serving base station receives the RRC connection resume request message.

The RRC connection resume request message may carry the identification information of the terminal. The identification information may uniquely indicate the terminal in an RNA area. In this case, the identification information may also be resume identification information, for example, resume ID information.

Operation S404. The serving base station sends a terminal context request message (Retrieve UE Context Request) to the anchor base station, where the terminal context request message is used to obtain terminal context information reserved in the anchor base station, to establish the RRC connection between the terminal UE and the serving base station.

Operation S405. The anchor base station receives the RRC connection resume message, and obtains the terminal context information reserved in the anchor base station. For details about operation S402 to operation S405, refer to related descriptions of operation S302 to operation S304 in the foregoing embodiment. Details are not described herein again.

Operation S406. The anchor base station sends a terminal context response message (Retrieve UE Context Response) to the serving base station, where the terminal context response message carries the terminal context information, the terminal context response message carries downlink data indication information, and the downlink data indication information is used to indicate that the anchor base station has to-be-transmitted downlink data needing to be transmitted.

In at least one embodiment, the downlink data indication information may be used to indicate data that is of a second transmission granularity (that is, at least one identifier of a second transmission granularity) and that is intended to be transmitted by the anchor base station to the serving base station. To some extent, it may be understood that the terminal context response message may carry the at least one identifier of the second transmission granularity, and the identifier of the second transmission granularity is used to indicate that the anchor base station needs to send, to the serving base station, data that is of the second transmission granularity and that corresponds to the identifier. The identifier of the second transmission granularity may be an identifier of a PDU session, an identifier of a QoS flow, or an identifier of a DRB.

In some embodiments, the terminal context response message may further indicate mapping relationships between identifiers of different transmission granularities, for an example, indicate mapping relationships between any two or three of the PDU session, the QoS flow, and the DRB. The mapping relationships include a mapping relationship between an identifier of a first transmission granularity and the identifier of the second transmission granularity. In at least one embodiment, the mapping relationship indicates a PDU session corresponding to each specific QoS flow, a DRB corresponding to each specific QoS flow, and a PDU session corresponding to each specific DRB. For example, a DRB 1 and a DRB 2 correspond to a PDU session 1, a DRB 3 and a DRB 4 correspond to a PDU session 2, and a QoS flow 1 and a QoS flow 2 correspond to a DRB 3. Therefore, the QoS flow 1 and the QoS flow 2 correspond to the PDU session 2.

In some embodiments, the downlink data indication information may be used to indicate, by using the first transmission granularity, that the anchor base station has to-be-transmitted downlink data. The first transmission granularity may be any one of the PDU session, the DRB, and the QoS flow. For example, if the first transmission granularity is a PDU session, for any PDU session, if the second base station expects to send downlink data through the Xn interface, the PDU session may include the downlink data indication information.

For example, the first transmission granularity is a QoS flow. For example, the following Table 1 shows a (part of) specific representation manner of the terminal context response message (e.g., a first message).

TABLE 1

L1: PDU session resource to be setup list % List of PDU sessions needing to be set up
L2: >PDU session resource to be setup item IEs % Information about a specific session in the list of the PDU sessions needing to be set up
L3: >>PDU session ID (FFS) % ID of the PDU session
L4: >>QoS flows to be setup list % List of QoS flows needing to be set up
L5: >>>QoS flows to be setup item IEs % Information about a specific flow in the list of the QoS flows needing to be set up
L6: >>>>QoS flows indicator % Indicator of the QoS flow
L7: >>>>DL forwarding % For whether the QoS flow has downlink data that needs to be transmitted It can be learned from Table 1 that L3 may carry an identifier of the PDU session (which may be considered as the identifier of the second transmission granularity), and L3 and L4 to L6 indicate a mapping/binding relationship between the identifier of the PDU session and an identifier of the QoS flow, for an example, indicate a QoS flow needing to be set up in a specific PDU session. L6 and L7 indicate a QoS flow whose data needs to be transmitted, for an example, indicate an identifier of the QoS flow whose data is transmitted. In at least one embodiment, L7 further indicates that the second base station instructs, by using a QoS flow granularity (which may be considered as the first transmission granularity), the first base station to transmit data, that is, indicate to-be-transmitted data by using the QoS flow granularity.

For example, the first transmission granularity is the PDU session. For example, the following Table 2 shows a (part of) specific representation manner of the terminal context response message (e.g., a first message).

TABLE 2

L1: PDU session resource to be setup list % List of PDU sessions needing to be set up
L2: >PDU session resource to be setup item IEs % Information about a specific session in the list of the PDU sessions needing to be set up
L3: >>PDU session ID (FFS) % ID of the PDU session
L4: >>DL forwarding % For whether the PDU session has downlink data that needs to be transmitted
L5: >>QoS flows to be setup list % List of QoS flows needing to be set up
L6: >>>QoS flows to be setup item IEs % Information about a specific flow in the list of the QoS flows needing to be set up
L7: >>>>QoS flows indicator % Indicator of the QoS flow It can be learned from Table 2 that L3 may carry an identifier of the PDU session (which may be considered as the identifier of the second transmission granularity), and L3 and L7 indicate a mapping/binding relationship between the identifier of the PDU session and an identifier of the QoS flow, for an example, indicate a QoS flow needing to be set up in a specific PDU session. L3 and L4 indicate a PDU session whose data needs to be transmitted, for an example, indicate an identifier of the PDU session whose data is transmitted. In at least one embodiment, L3 and L4 further indicate that the second base station instructs, by using a PDU session granularity (the first transmission granularity), the first base station to transmit data, that is, indicate to-be-transmitted data by using the PDU session granularity.

In some embodiments, the downlink data indication information indicates, by using the first transmission granularity, downlink data that needs to be sent by the anchor base station and that is of the first transmission granularity (that is, at least one identifier of the first transmission granularity)

needs to be transmitted, and further indicates the mapping relationship between the identifier of the first transmission granularity and the identifier of the second transmission granularity. In this case, the serving base station may determine at least one corresponding identifier of the second transmission granularity based on the at least one identifier of the first transmission granularity and the mapping relationship between the identifier of the first transmission granularity and the identifier of the second transmission granularity. For example, the first transmission granularity is the QoS flow, and the second transmission granularity is the PDU session. A PDU session to which each identifier of the QoS flow correspondingly belongs may be determined based on the mapping relationship indicated in Table 1. For details, refer to related descriptions in the foregoing embodiment. Details are not described herein again.

It should be noted that, for each identifier of the second transmission granularity or each identifier of the first transmission granularity, the downlink data indication information does not need to be carried, and only for the second transmission granularity or the first transmission granularity that is in the anchor base station and whose downlink data needs to be transmitted, the downlink data indication information needs to be carried.

Operation S407. Correspondingly, the serving base station receives the terminal context response message. The serving base station assigns a corresponding address to each of the at least one identifier of the second transmission granularity, and one address corresponds to one identifier of the second transmission granularity.

In at least one embodiment, the serving base station assigns, based on the downlink data indication message in S406 and the mapping relationships between the PDU session, the DRB, and the QoS flow, an address to the to-be-transmitted data by using the second transmission granularity, and sends a data transmission address notification message (Data Forwarding Address Notification) to the anchor base station, where the data transmission address notification message includes address information corresponding to the to-be-transmitted data. The second transmission granularity may be a QoS flow, a DRB, or a PDU session. In at least one embodiment, if the first transmission granularity is a QoS flow, the second transmission granularity may be a QoS flow, a DRB, or a PDU session. If the first transmission granularity is a DRB, the second transmission granularity may be a DRB or a PDU session. If the first transmission granularity is a PDU session, the second transmission granularity is a PDU session. For example, if the DRB 1 and the DRB 2 correspond to the PDU session 1, the DRB 3 and the DRB 4 correspond to the PDU session 2, and the QoS flow 1 and the QoS flow 2 correspond to the DRB 3, so that the QoS flow 1 and the QoS flow 2 correspond to the PDU session 2, the second transmission granularity is a PDU session, and the first transmission granularity is a QoS flow. If the QoS flow 1 has to-be-transmitted downlink data in the anchor base station, the serving base station assigns an address to the PDU session 2.

Operation S408. The serving base station sends the data transmission address notification message to the anchor base station, where the data transmission address notification message carries an identifier that is of the second transmission granularity and that corresponds to each of the at least one address.

In at least one embodiment, the serving base station may notify, by using the data transmission address notification message, the anchor base station of the at least one address assigned by the serving base station to the to-be-transmitted data of the anchor base station, and the identifier that is of the second transmission granularity and that corresponds to each of the at least one address. The data transmission address notification message herein may be still another representation manner of the second message.

The following Table 3 shows an example of a part of a specific representation manner of the data transmission address notification message (e.g., the second message).

TABLE 3

L1: Message type % Message type
L2: Old gNB UE XnAP ID % XnAP identifier of a terminal in a transmit end, used by the transmit end to uniquely identify the terminal on an Xn interface
L3: New gNB UE XnAP ID % XnAP identifier of a terminal in a receive end, used by the receive end to uniquely identify the terminal on the Xn interface
L4: PDU session resource subject to add transfer list % Address list of PDU sessions on which transmission needs to be performed
L5: >PDU session resource subject to add transfer item % Information about a specific address in the address list the PDU sessions on which transmission needs to be performed
L6: >>PDU session ID (FFS) % ID of the PDU session, a second transmission granularity
L7: >>DL address/tunnel endpoint % Downlink address information It can be learned from Table 3 that L6 carries an identifier of the PDU session (e.g., the identifier of the second transmission granularity), and L6 and L7 jointly indicate a mapping/binding relationship between the identifier of the PDU session and a downlink address (e.g., the mapping relationship between the identifier of the second transmission granularity and the address). In at least one embodiment, a specific PDU session corresponds to a specific downlink address.

Operation S409. The serving base station sends an RRC connection resume message (RRC Connection Resume) to the terminal, where the RRC connection resume message is used to notify the terminal that the RRC connection to the serving base station is resumed and established. It should be noted that operation S408 and operation S409 may be parallel, for an example, operation S409 may be performed before operation S408. This is not limited in the embodiment of the invention.

Based on the foregoing embodiments, an embodiment of uplink data transmission in the embodiments of the invention is described below. In the uplink data transmission embodiment, the second base station may be a serving base station (NgNB), and the first base station may be an anchor base station (AgNB).

Figure 5:
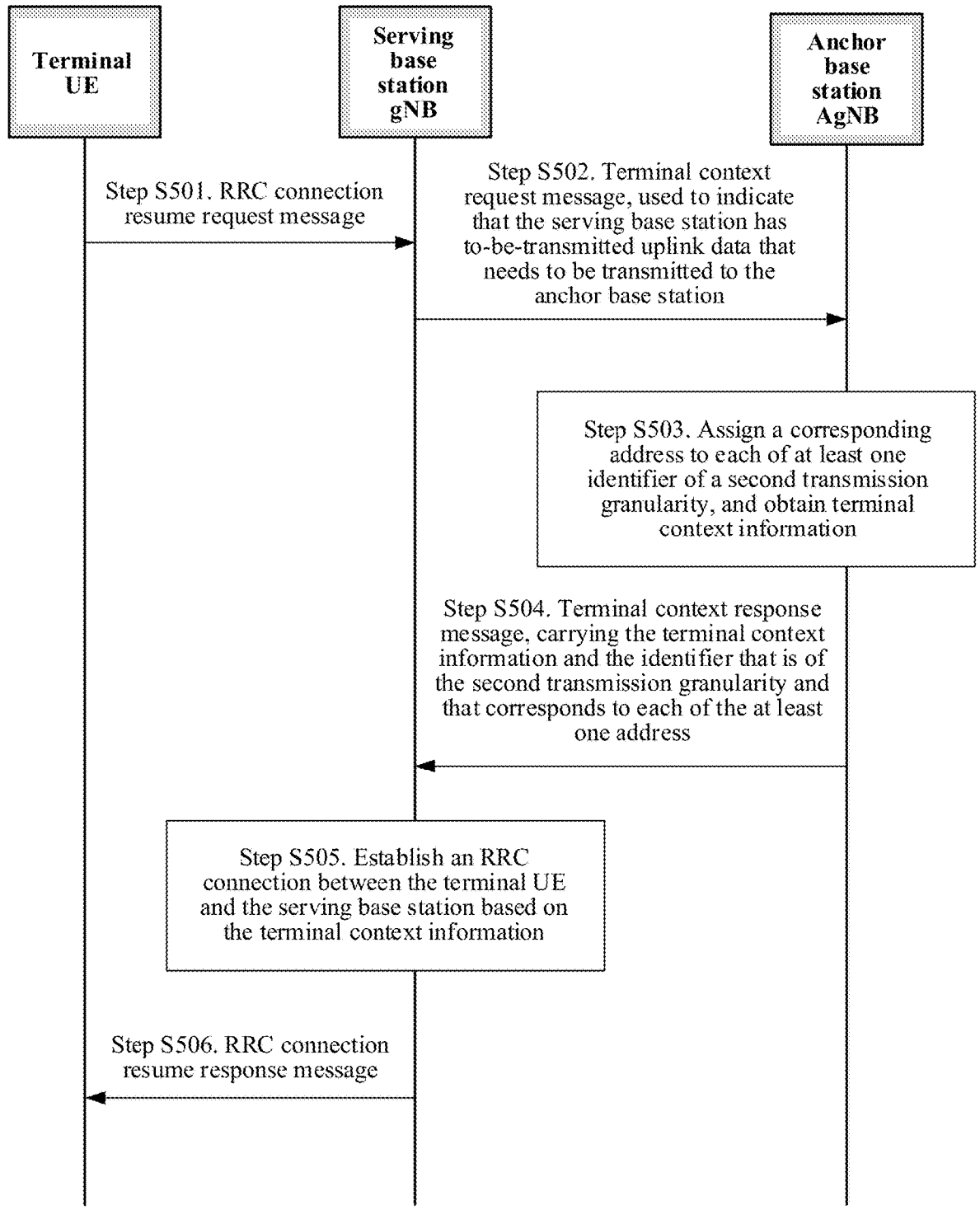
FIG. 5 is a schematic flowchart of an uplink data transmission method according to an embodiment of the invention.

FIG. 5 is a schematic flowchart of an uplink data transmission method. The method includes the following operations.

Operation S501. A terminal sends an RRC connection resume request message (RRC Connection Resume Request) to a serving base station, where the RRC connection resume request message is used to request to resume an RRC connection between the terminal and the serving base station. Correspondingly, the serving base station receives the RRC connection resume request message.

Operation S502. The serving base station sends a terminal context request message (Retrieve UE Context Request) to the anchor base station, where the terminal context request message is used to obtain terminal context information reserved in the anchor base station, and is further used to indicate that the serving base station has to-be-transmitted uplink data that needs to be transmitted to the anchor base station. Correspondingly, the anchor base station receives the terminal context request message.

In at least one embodiment, the terminal context request message carries uplink data indication information, and the uplink data indication information is used to indicate that the serving base station has the to-be-transmitted uplink data that needs to be transmitted to the anchor base station.

In some embodiments, the uplink data indication information may be used to indicate uplink data that is of a second transmission granularity and that currently needs to be transmitted by the serving base station to the anchor base station (that is, at least one identifier of the second transmission granularity). The terminal context request message herein may be still another representation manner of a first message. For details about operation S501 and operation S502, refer to related descriptions in the foregoing embodiment. Details are not described herein again.

In some embodiments, the terminal context request message may carry the at least one identifier of the second transmission granularity, and the identifier of the second transmission granularity is used to indicate that the serving base station needs to transmit uplink data that is of the second transmission granularity and that corresponds to the identifier to the anchor base station. The identifier of the second transmission granularity may be an identifier of a PDU session, an identifier of a QoS flow session, or an identifier of a DRB.

Optionally, the terminal context response message further indicates mapping relationships between identifiers of different transmission granularities, for an example, indicates mapping relationships between any two or three of the PDU session, the QoS flow, and the DRB. Certainly, the mapping relationships include a mapping relationship between an identifier of a first transmission granularity and the identifier of the second transmission granularity. For details, refer to the foregoing related embodiment. Details are not described herein again.

Operation S503. The anchor base station assigns a corresponding address to each of the at least one identifier of the second transmission granularity, and obtains terminal context information. Different addresses are used to identify different data flows that are in the to-be-transmitted data and that are in a form of the second transmission granularity.

In at least one embodiment, after receiving the terminal context request message, the anchor base station may obtain the terminal context information reserved in the anchor base station. In addition, after the anchor base station learns of uplink data that is of the second transmission granularity and that currently needs to be transmitted by the serving base station (that is, the at least one identifier of the second transmission granularity), the anchor base station may assign a corresponding address to each of the at least one identifier of the second transmission granularity. One identifier of the second transmission granularity corresponds to one address.

In other words, the anchor base station assigns an address to the to-be-transmitted data by using the second transmission granularity. That is, the anchor base station assigns and determines an address correspondingly used by a downlink PDU session/DRB/QoS flow transmitted through the Xn interface.

Operation S504. The anchor base station sends a terminal context response message (Retrieve UE Context Response) to the serving base station, where the terminal context response message carries the terminal context information and the identifier that is of the second transmission granularity and that corresponds to each of the at least one address.

Correspondingly, the serving base station receives the terminal context response message.

In at least one embodiment, after obtaining the terminal context information and assigning the corresponding address to each of the at least one identifier of the second transmission granularity, the anchor base station may notify the serving base station in a form of the terminal context response message. The terminal context response message herein may be still another representation manner of a second message.

Operation S505. The serving base station establishes an RRC connection between the terminal UE and the serving base station based on the terminal context information.

Operation S506. The serving base station sends an RRC connection resume response message (RRC Connection Resume Response) to the terminal, where the RRC connection resume response message is used to notify the terminal that the RRC connection to the serving base station is resumed and established.

It should be noted that operation S504 may alternatively be performed after operation S506. This is not limited in the embodiment of the invention.

In some embodiments, when the terminal context request message in operation S502 is used to indicate that the serving base station has to-be-transmitted uplink data that needs to be transmitted to the anchor base station, but does not indicate data that is of the second transmission granularity and that needs to be transmitted by the serving base station to the anchor base station (that is, the at least one identifier of the second transmission granularity), in operation S403, after the anchor base station receives the terminal context request message, the anchor base station may assign, based on an address quantity set by default or an address quantity carried in another procedure message, addresses whose quantity is the same as the address quantity to the to-be-transmitted data (e.g., the uplink data herein) of the serving base station.

In some embodiments, the terminal context request message in operation S502 is used to indicate that the serving base station has to-be-transmitted uplink data that needs to be transmitted to the anchor base station, and the terminal context request message carries an address quantity (e.g., a quantity of addresses that need to be assigned by the serving base station to the anchor base station), therefore, in operation S503, the anchor base station may assign addresses whose quantity is the same as the address quantity to the to-be-transmitted data (e.g., the uplink data herein) of the serving base station.

Correspondingly, in operation S504, the terminal context response message carries the terminal context information and the at least one address (for an example, the addresses whose quantity is the same as the address quantity), but does not carry the identifier that is of the second transmission granularity and that corresponds to each of the at least one address.

In some embodiments, the terminal context request message may be further used to indicate that the serving base station actually sends the to-be-transmitted uplink data to the anchor base station based on the second transmission granularity.

In some embodiments, the serving base station knows data that is of a first transmission granularity and that needs to be sent by the serving base station to the anchor base station (that is, at least one identifier of the first transmission granularity). The serving base station may determine, based on the at least one identifier of the first transmission granularity and the mapping relationship between the identifier of the first transmission granularity and the identifier of the second transmission granularity, at least one corresponding identifier of the second transmission granularity and/or a quantity of the at least one identifier of the second transmission granularity. Herein, the quantity of the at least one identifier of the second transmission granularity is the address quantity.

In some embodiments, the terminal context request message in operation S502 is used to indicate data that is of a first transmission granularity and that needs to be transmitted by the serving base station to the anchor base station (that is, the at least one identifier of the first transmission granularity. In this case, the terminal context request message further carries the mapping relationship between the identifier of the second transmission granularity and the identifier of the first transmission granularity. Optionally, the terminal context request message is further used to indicate that the serving base station actually sends the to-be-transmitted data to the anchor base station based on the second transmission granularity.

Correspondingly, the anchor base station receives the terminal context request message. When the anchor base station determines that the serving base station actually transmits the data to the anchor base station based on the second transmission granularity, in operation S503, the anchor base station may determine, based on the at least one identifier of the first transmission granularity and the mapping relationship between the identifier of the first transmission granularity and the identifier of the second transmission granularity, at least one corresponding identifier of the second transmission granularity and/or a quantity of the at least one identifier of the second transmission granularity.

In a possible implementation, if the anchor base station determines the at least one identifier of the second transmission granularity, the anchor base station may continue to perform operation S503.

In another possible implementation, after the anchor base station determines the quantity of the at least one identifier of the second transmission granularity (e.g., the address quantity), in operation S503, the anchor base station may assign addresses whose quantity is the same as the address quantity to the to-be-transmitted data of the serving base station (e.g., the uplink data herein). Similarly, in operation S504, the terminal context response message carries the at least one address (for an example, the addresses whose quantity is the same as the address quantity), but does not carry the identifier that is of the second transmission granularity and that corresponds to each of the at least one address.

In some embodiments, if the terminal context response message sent to the anchor base station in operation S504 carries the at least one address rather than the identifier that is of the second transmission granularity and that corresponds to each of the at least one address, after learning of the at least one address, the anchor base station may assign the corresponding identifier of the second transmission granularity to each of the at least one address (for an example, assign a piece of data or a data flow that is transmitted through the Xn interface and that is in the form of the second transmission granularity in the to-be-transmitted data).

Optionally, the anchor base station may send a data transmission address notification message to the serving base station, where the data transmission address notification message carries the identifier that is of the second transmission granularity and that corresponds to each of the at least one address, to notify the serving base station of a binding/mapping relationship between the address and the identifier of the second transmission granularity. Correspondingly, the serving base station receives the data transmission address notification message. The data transmission address notification message herein may be another representation manner of a third message.

It should be noted that, for details about operation S501 to operation S504, refer to related content descriptions in the foregoing embodiment. Details are not described herein again.

Figure 6:
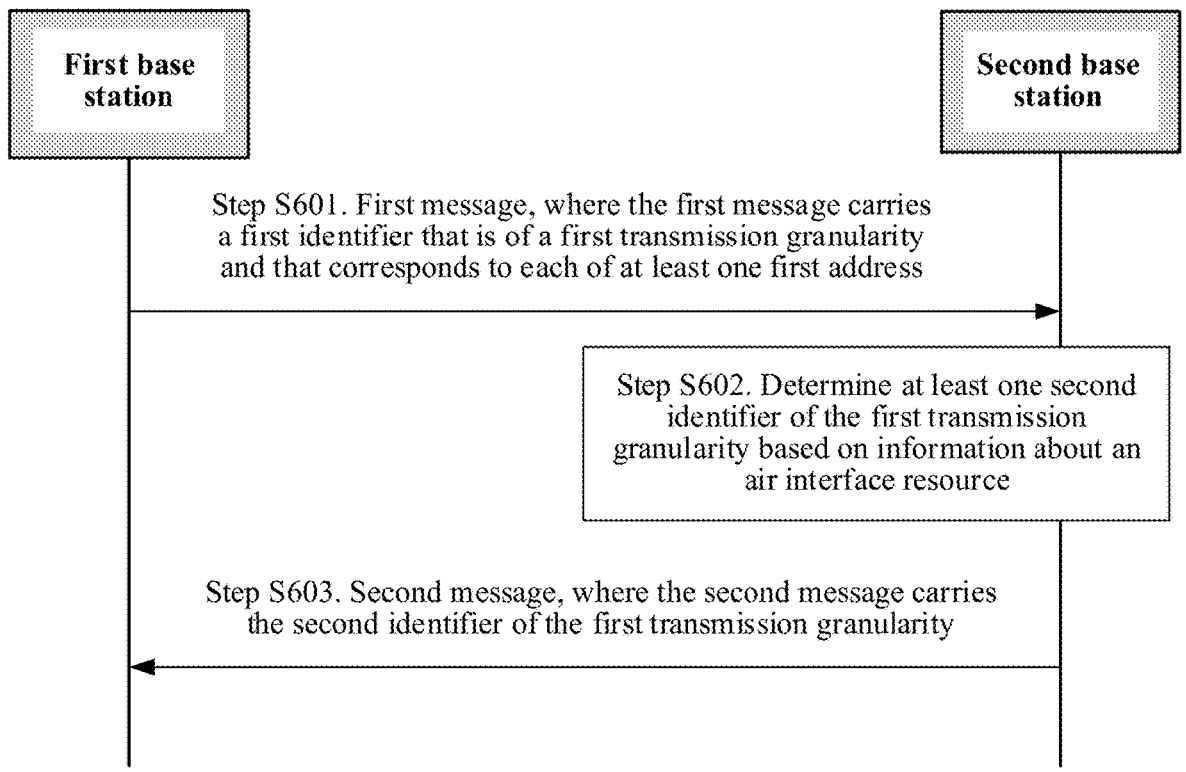
FIG. 6 is a schematic flowchart of another data transmission method according to an embodiment of the invention.

Based on the foregoing embodiment, FIG. 6 is a schematic flowchart of another data transmission method according to an embodiment of the invention. The method includes the following implementation operations. Data transmission herein is uplink data transmission, the first base station may be a source base station, and the second base station may be a target base station.

In this application, a terminal UE in a connected state sends uplink data to the first base station (e.g., the source base station). Due to mobility of the terminal, the terminal moves from the first base station to the second base station, and based on information such as a measurement report, the first base station determines to hand over the terminal to the second base station (e.g., the target base station). To ensure a zero-millisecond handover delay of the terminal, the terminal needs to simultaneously send the uplink data to the two base stations within a period of time in a handover process. In at least one embodiment, the terminal may send the uplink data to a core network side by using a communications link from the terminal to the second base station to the first base station to the core network and a communications link from the terminal to the first base station to the core network. Therefore, the second base station needs to obtain uplink address information corresponding to the first base station, for transmitting the uplink data by the second base station through an Xn interface.

Operation S601. The first base station sends a first message to the second base station, where the first message carries an address corresponding to each of at least one first identifier of a first transmission granularity, and the address is used to identify data that is of the first transmission granularity and that needs to be transmitted between the first base station and the second base station. Correspondingly, the second base station receives the first message.

In some embodiments, the first transmission granularity may include any one of the following: a PDU session, a QoS flow, and a DRB. The identifier of the first transmission granularity may be any one of the following: an identifier of the PDU session, an identifier of the QoS flow, and an identifier of the DRB.

In some embodiments, the first message may carry uplink data indication information, where the uplink data indication information may be used to indicate data that is of a first transmission granularity and that needs to be transmitted (that is, the at least one first identifier of the at least one first transmission granularity), and may further indicate the address corresponding to each first identifier of the at least one first transmission granularity. It may be understood to some extent that the first message may carry the at least one first identifier of the first transmission granularity, and when actually sending the first message to the second base station, the first base station adds an address corresponding to each first identifier of the first transmission granularity to the first message for transmission. That is, the first base station actually notifies, by using the first message, the second base station of the address corresponding to each of the at least one first identifier of the first transmission granularity.

The address herein may also be uplink data transmission address information corresponding to the first identifier of the first transmission granularity. One first identifier of the first transmission granularity corresponds to one address (or one piece of uplink data address information).

For example, that the QoS flow is the first transmission granularity is used as an example (that the PDU session and the DRB each are the first transmission granularity may also be very easily obtained based on the following table). As shown in the following Table 4, a part of a specific representation manner of the first message is provided.

TABLE 4

L1: PDU session resource to be setup list % List of PDU sessions needing to be set up
L2: >PDU session resource to be setup item IEs % Information about a specific session in the list of the PDU sessions needing to be set up
L3: >>PDU session ID (FFS) % ID of the PDU session
L4: >>QoS flows to be setup list % List of QoS flows needing to be set up
L5: >>>QoS flows to be setup item IEs % Information about a specific flow in the list of the QoS flows needing to be set up
L6: >>>>QoS flows indicator % Indicator of the QoS flow
L7: >>>>UL address/tunnel endpoint % Uplink address information corresponding to the QoS flow It can be learned from Table 4 that L3 may carry an identifier of the PDU session (which may be considered as the first identifier of the first transmission granularity), and L3 and L6 indicate a mapping/binding relationship between the identifier of the PDU session and an identifier of the QoS flow, for an example, indicate a QoS flow that can be set up in a specific PDU session, in other words, an identifier of a PDU session may correspond to an identifier of at least one QoS flow. L6 and L7 indicate a mapping relationship between the identifier of the QoS flow and the address, for an example, an uplink address (or uplink address information) corresponding to a specific QoS flow.

In some embodiments, before the first base station sends the first message to the second base station, the method further includes: assigning, by the first base station, a corresponding address to the at least one identifier of the first transmission granularity. For details, refer to related descriptions in the foregoing embodiment. Details are not described herein again.

In some embodiments, if the first base station learns of at least one identifier of a second transmission granularity, in the terminal UE, whose data needs to be transmitted, the first base station may determine, based on the at least one identifier of the second transmission granularity, and a mapping relationship between the identifier of the first transmission granularity and the identifier of the second transmission granularity, at least one corresponding first identifier of the first transmission granularity. Subsequently, the first base station may assign a corresponding address to each of the at least one first identifier of the first transmission granularity. For details, refer to related descriptions in the foregoing embodiment. Details are not described herein again.

It should be noted that not each first identifier of the first transmission granularity carries the uplink data indication information, and only the second transmission granularity or the first transmission granularity that is in the anchor base station and whose downlink data needs to be transmitted carries the downlink data indication information.

Operation S602. The second base station determines a second identifier of the first transmission granularity based on information about an air interface resource, where the second identifier is one or more of the at least one first identifier.

In at least one embodiment, the second base station may determine, based on factors such as a time-frequency resource of an air interface, a first transmission granularity whose data needs to be transmitted and that is to be established for the terminal/first base station. That is, the second base station may determine, based on resource information such as the time-frequency resource of the air interface, the second identifier of the first transmission granularity in the first identifier of the first transmission granularity. The second identifier of the first transmission granularity may include any one or more of the following: a PDU session, a DRB, and a QoS flow. The information about the air interface resource may be utilization information of the air interface resource, and may include information such as the time-frequency resource of the air interface.

Operation S603. The second base station sends a second message to the first base station, where the second message carries the second identifier of the first transmission granularity. Correspondingly, the second base station receives the second message.

In at least one embodiment, the second base station may notify, by using the second message, the first base station of the second identifier of the first transmission granularity that is confirmed to be established and whose data needs to be transmitted.

The first message may be a handover request acknowledgement (Handover Request ACK), another procedure message, or the like. This is not limited in the embodiment of the invention.

According to the foregoing solution, prior-art problems that when the first base station and the second base station transmit data, one end does not know how to identify the to-be-transmitted data, and the other end does not know data that is currently received can be resolved. This improves data transmission efficiency.

The foregoing mainly describes the solution provided in the embodiment of the invention from the perspective of interaction between the first base station and the second base station, and optionally, interaction between the terminal is included. It may be understood that to implement the foregoing functions, the first base station and the second base station include corresponding hardware structures and/or software modules for performing the functions. With reference to the units and algorithms described in the examples of the embodiments of the invention, the embodiments of the invention can be implemented in a form of hardware or a combination of hardware and computer software. Whether a function is performed by hardware or hardware driven by computer software depends on particular applications and design constraints of the technical solutions. One of ordinary skill in the art may use different methods to implement the described functions for each particular application, but it should not be considered that the implementation falls beyond the scope of the technical solutions in embodiments of the invention.

In the embodiments of the invention, functional units of the first base station and the second base station may be divided based on the foregoing method example. For example, each functional unit may be divided based on each function, or two or more functions may be integrated into one processing unit. The integrated unit may be implemented in a form of hardware, or may be implemented in a form of a software functional unit. It should be noted that, in the embodiment of the invention, unit division is an example, and is merely a logical function division. In actual implementation, another division manner may be used.

Figure 7A:
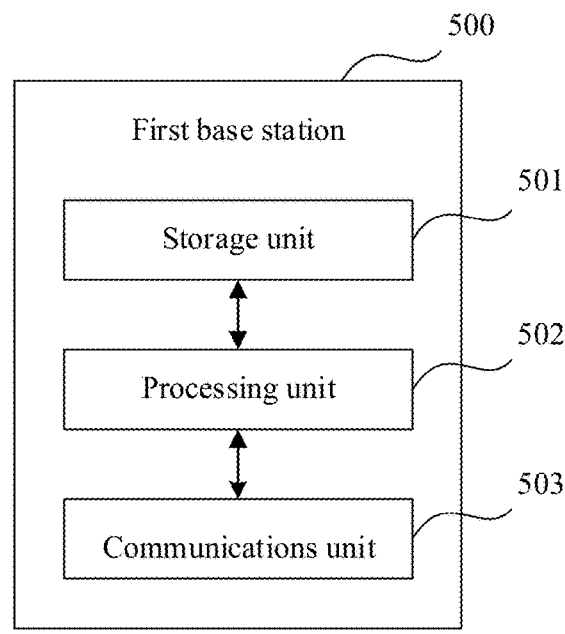
FIG. 7A is a schematic structural diagram of a first base station according to an embodiment of the invention.

When the integrated unit is used, FIG. 7A is a possible schematic structural diagram of the first base station in the foregoing embodiment. The first base station 500 includes a processing unit 502 and a communications unit 503. The processing unit 502 is configured to control and manage an action of the first base station 500. For example, in an embodiment of the invention, the processing unit 502 is configured to support the first base station 500 in performing operation S202 in FIG. 2, operation S306 in FIG. 3, operation S406 and operation S408 in FIG. 4, and operation S503 in FIG. 5, and/or is configured to perform another operation in the technology described in this specification. The communications unit 503 is configured to support the first base station 500 in communicating with another network device. For example, the communications unit 503 is configured to support the first base station 500 in performing operation S203 in FIG. 2, operation S303 and operation S307 in FIG. 3, operation S403 and operation S407 in FIG. 4, and operation S504 in FIG. 5, and/or is configured to perform another operation in the technology described in this specification. In another embodiment of the invention, the processing unit 502 is configured to support the first base station 500 in performing operation S601 in FIG. 6, and/or is configured to perform another operation in the technology described in this specification. The communications unit 503 is configured to support the first base station 500 in communicating with another network device. For example, the communications unit 503 is configured to support the first base station 500 in performing operation S601 in FIG. 6, and/or is configured to perform another operation in the technology described in this specification.

Optionally, the first base station 500 may further include a storage unit 501, configured to store program code and data of the first base station 500.

The processing unit 502 may be a processor or a controller, for example, may be a central processing unit (CPU), a network processor (NP), or a combination of a CPU and an NP. The processing unit 502 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The communications unit 503 includes a communications interface, a transceiver, a transceiver circuit, and the like. The communications interface is a general term, and may include one or more interfaces, for example, an interface between the first base station and the second base station.

The storage unit 501 may be a memory. The memory may include a volatile memory such as a random access memory (RAM); or the memory may include a non-volatile memory such as a flash memory, a hard disk drive (HDD), or a solid-state drive SSD for short); or the memory 410 may include a combination of the foregoing types of memories.

Figure 7B:
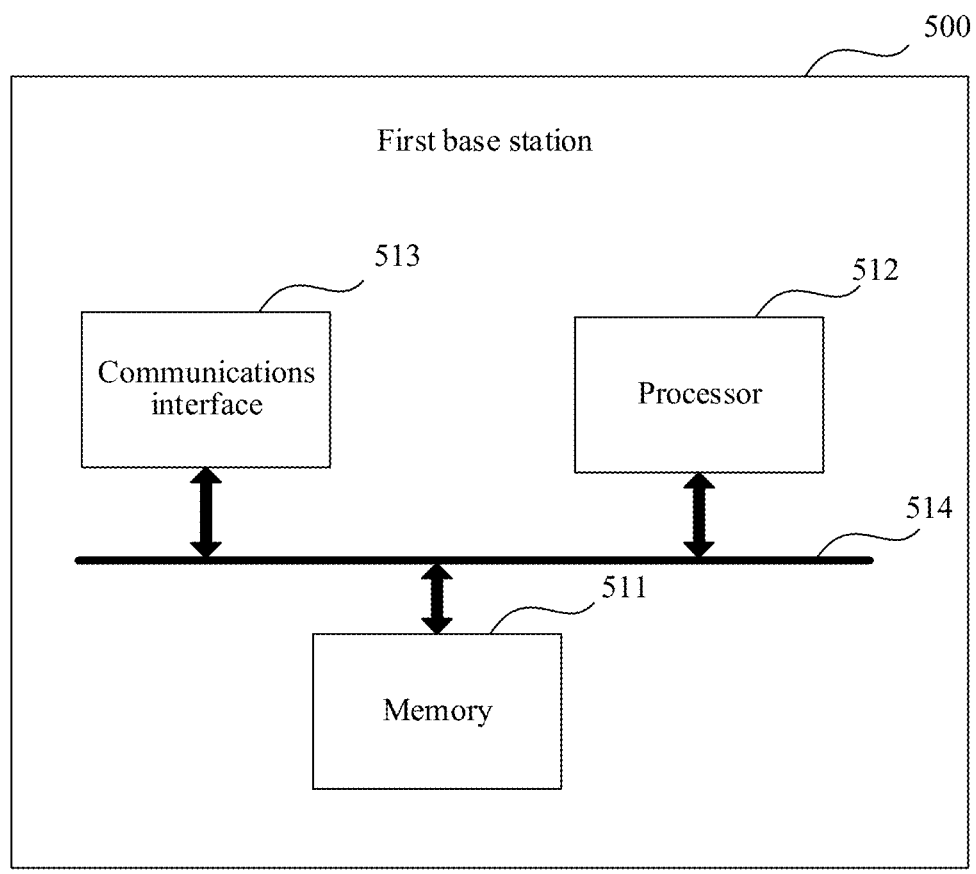
FIG. 7B is a schematic structural diagram of another first base station according to an embodiment of the invention.

When the processing unit 502 is a processor, the communications unit 503 is a communications interface, and the storage unit 501 is a memory, the first base station in the embodiment of the invention may be a first base station shown in FIG. 7B.

Referring to FIG. 7B, the first base station 500 includes a processor 512, a communications interface 513, and a memory 511. Optionally, the first base station 500 may further include a bus 514. The communications interface 513, the processor 512, and the memory 511 may be connected to each other by using the bus 514. The bus 514 may be classified into an address bus, a data bus, a control bus, and the like. For ease of representation, only one thick line is used to represent the bus in FIG. 7B, but this does not mean that there is only one bus or only one type of bus.

In some embodiments, the first base station may be any one of the following: a serving base station, an anchor base station, a source base station, and a target base station.

For an embodiment of the first base station shown in FIG. 7A or FIG. 7B, correspondingly refer to the corresponding description of the foregoing method embodiment. Details are not described herein again.

Figure 8A:
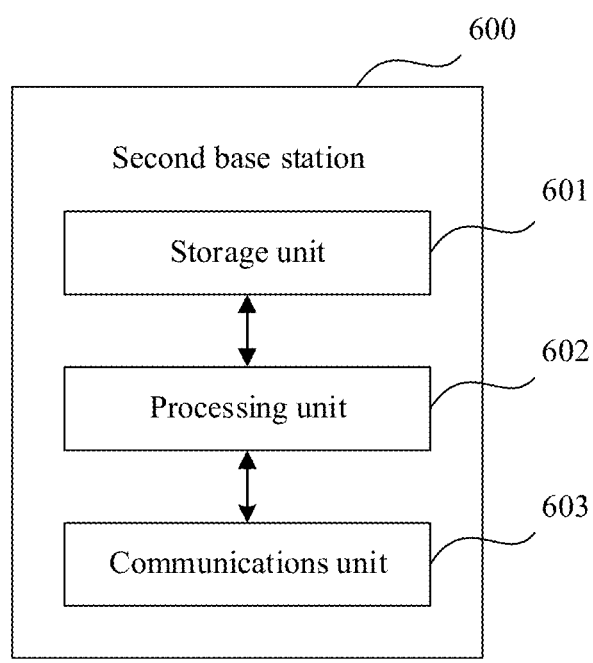
FIG. 8A is a schematic structural diagram of a second base station according to an embodiment of the invention.

FIG. 8A is a possible schematic structural diagram of the second base station according to an embodiment. The second base station 600 includes a processing unit 602 and a communications unit 603. The processing unit 602 is configured to control and manage an action of the second base station 600. For example, in an embodiment of the invention, the processing unit 602 is configured to support the second base station 600 in performing operation S304 in FIG. 3, operation S404 in FIG. 4, operation S505 in FIG. 5, and operation S503 in FIG. 6, and/or is configured to perform another operation in the technology described in this specification. The communications unit 503 is configured to support the second base station 600 in communicating with another network device. For example, the communications unit 603 is configured to support the second base station 600 in performing operation S201 in FIG. 2, operation S301 and operation S305 in FIG. 3, operation S401 and operation S405 in FIG. 4, operation S502 and operation S506 in FIG. 5, and operation S603 in FIG. 6, and/or is configured to perform another operation in the technology described in this specification.

In another embodiment of the invention, the processing unit 602 is configured to support the second base station 600 in performing operation S602 in FIG. 6, and/or is configured to perform another operation in the technology described in this specification. The communications unit 503 is configured to support the second base station 600 in communicating with another network device. For example, the communications unit 603 is configured to support the second base station 600 in performing operation S603 in FIG. 6, and/or is configured to perform another operation in the technology described in this specification.

Optionally, the second base station 600 may further include a storage unit 601, configured to store program code and data of the second base station 600.

The processing unit 602 may be a processor or a controller, for example, may be a CPU, an NP, or a combination of a CPU and an NP. The processing unit 602 may further include a hardware chip. The hardware chip may be an ASIC, a PLD, or a combination thereof. The PLD may be a CPLD, an FPGA, a GAL, or any combination thereof.

The communications unit 603 includes a communications interface, a transceiver, a transceiver circuit, and the like. The communications interface is a general term, and may include one or more interfaces, for example, an interface between the first base station and the second base station.

The storage unit 601 may be a memory. The memory may include a volatile memory, for example, a RAM; or the memory may include a non-volatile memory, for example, a flash, an HDD, or an SSD; or the memory may include a combination of the foregoing types of memories.

Figure 8B:
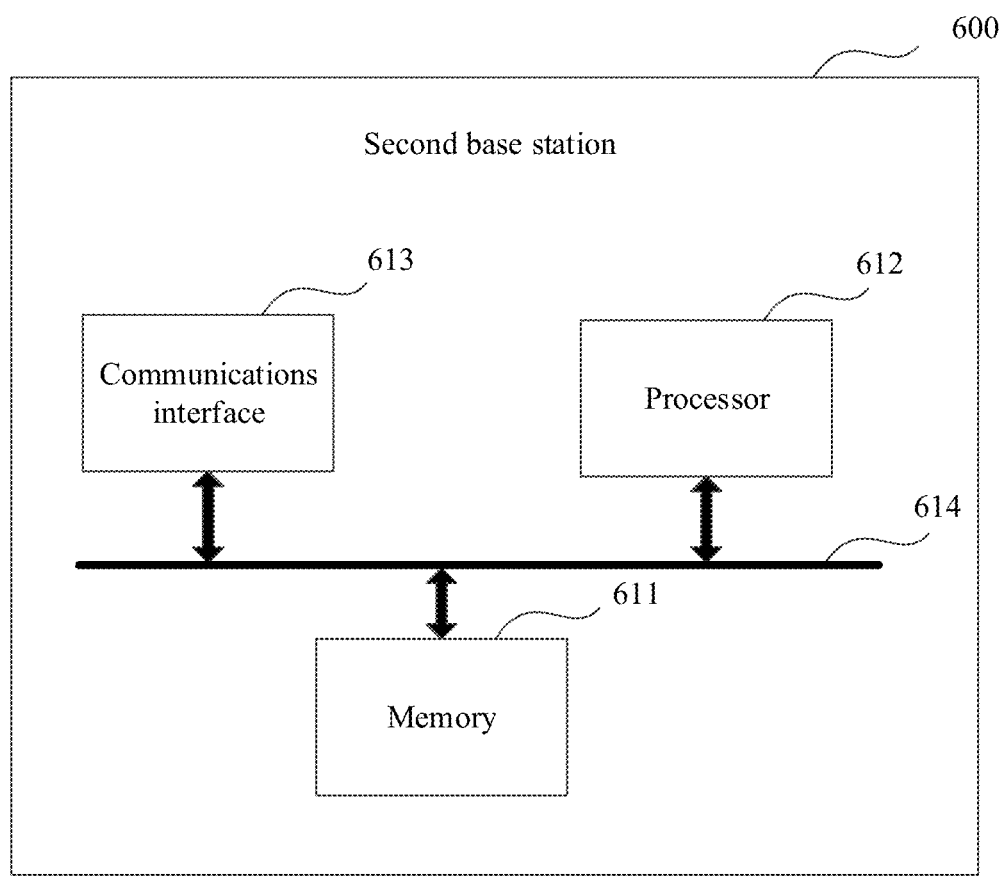
FIG. 8B is a schematic structural diagram of another second base station according to an embodiment of the invention.

When the processing unit 602 is a processor, the communications unit 603 is a communications interface, and the storage unit 601 is a memory, the second base station in the embodiment of the invention may be a second base station shown in FIG. 8B.

Referring to FIG. 8B, the second base station 600 includes a processor 612, a communications interface 613, and a memory 611. Optionally, the second base station 600 may further include a bus 614. The communications interface 613, the processor 612, and the memory 611 may be connected to each other by using the bus 614. The bus 614 may be classified into an address bus, a data bus, a control bus, and the like. For ease of representation, only one thick line is used to represent the bus in FIG. 8B, but this does not mean that there is only one bus or only one type of bus.

In some embodiments, the second base station may be any one of the following: a serving base station, an anchor base station, a source base station, and a target base station.

For an embodiment of the second base station shown in FIG. 8A or FIG. 8B, correspondingly refer to the corresponding description of the foregoing method embodiment. Details are not described herein again.

Figure 9:
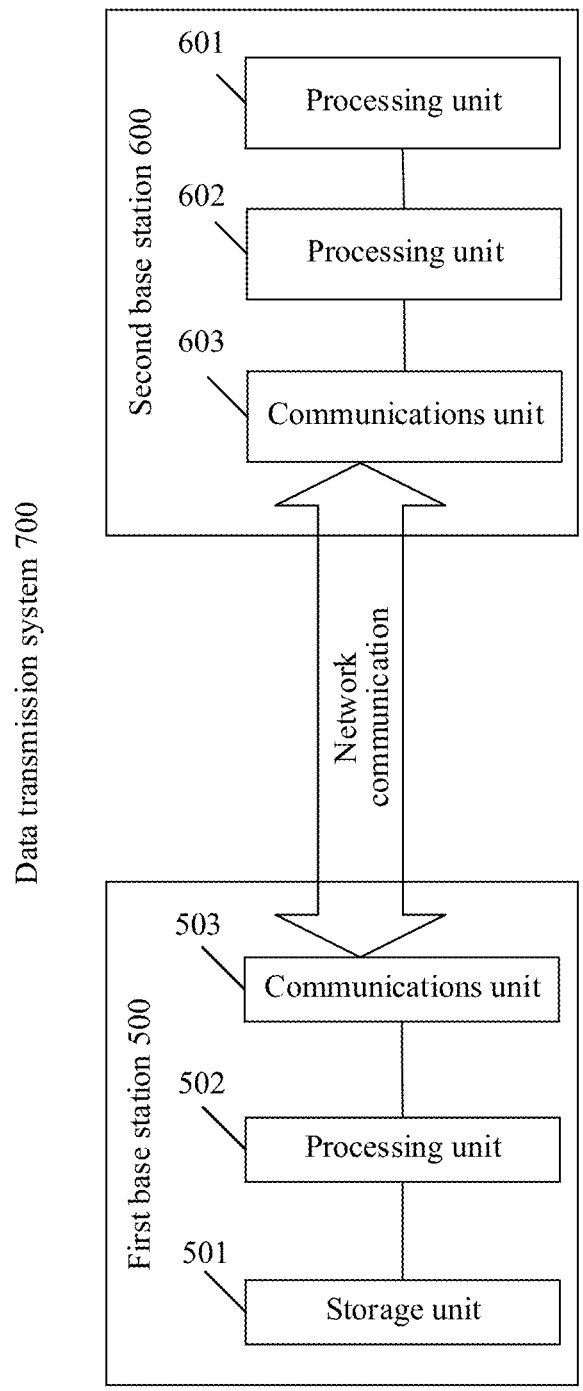
FIG. 9 is a schematic structural diagram of a data transmission system according to an embodiment of the invention.

FIG. 9 is a schematic structural diagram of a data transmission system according to an embodiment of the invention. The system 700 includes a first base station 500 and a second base station 600. The first base station 500 may be the first base station 500 shown in FIG. 7A or FIG. 7B, and details are not described herein again. The second base station 600 may be the second base station 600 shown in FIG. 8A or FIG. 8B, and details are not described herein again.

For an embodiment of the data transmission system shown in FIG. 9, correspondingly refer to the corresponding description of the foregoing method embodiment. Details are not described herein again.

According to the foregoing solution, prior-art problems that when the first base station and the second base station transmit data, one end does not know how to identify the to-be-transmitted data, and the other end does not know data that is currently received can be resolved. This improves data transmission efficiency.

Methods or algorithms described in combination with the content disclosed in the embodiment of the invention may be implemented by hardware, or may be implemented by a processor executing a software instruction. The software instruction may include a corresponding software module. The software module may be stored in a RAM, a flash memory, a read-only memory (ROM), an erasable programmable read-only memory (EEPROM), or an electrically erasable programmable read-only memory (EEPROM), a register, a hard disk, a removable hard disk, a compact disc read-only memory (CD-ROM), or a storage medium of any other form well-known in the art. For example, a storage medium is coupled with the processor, so that the processor can read information from the storage medium or write information into the storage medium. Certainly, the storage medium may alternatively be a component of the processor. The processor and the storage medium may be located in an ASIC. In addition, the ASIC may be located in the first base station or the second base station. Certainly, the processor and the storage medium may exist in the first base station or the second base station as discrete components.

A person of ordinary skill in the art may understand that all or some of the procedures of the methods in the embodiments may be implemented by a computer program instructing relevant hardware. The program may be stored in a computer-readable storage medium. When the program is executed, the procedures of the embodiments of the methods may be included. The foregoing storage medium includes any medium that can store program code, such as a ROM, a RAM, a magnetic disk, or an optical disc.

What is claimed is:

1. A data transmission method, the method comprising:
receiving, by a first base station, a first message sent by a second base station, wherein the first message is used to indicate that the second base station needs to transmit data;
assigning, by the first base station, at least one address to the data that need to be transmitted by the second base station, wherein the at least one address includes an address corresponding to the first base station that is used to identify data transmission through an interface between the first base station and the second base station; and
sending, by the first base station, a second message to the second base station, wherein the second message carries the at least one address, and the at least one address is used by the first base station to identify the data of the second base station, and wherein the data that needs to be transmitted is uplink data that needs to be transmitted to a core network and the second base station is a serving base station to which a user terminal (UE) in a radio resource control (RRC) inactive state is moved from an anchor base station that is the first base station, or wherein the data that need to be transmitted is downlink data that needs to be transmitted to the UE and the first base station is the serving base station and the second base station is the anchor base station, and wherein the first message carries an expected quantity of addresses, and an assigned quantity of the at least one address in the second message is the same as the expected quantity of addresses in the first message.

2. The method according to claim 1, wherein the first message carries at least one identifier of a first transmission granularity, and a mapping relationship between the identifier of the first transmission granularity and an identifier of a second transmission granularity; and the identifier of the first transmission granularity is used to identify the data that corresponds to the identifier of the first transmission granularity and that needs to be sent by the second base station to the first base station; and
wherein before the sending, by the first base station, the second message to the second base station, the method further comprises:
determining, by the first base station, at least one identifier of the second transmission granularity based on the at least one identifier of the first transmission granularity and the mapping relationship between the identifier of the first transmission granularity and the identifier of the second transmission granularity; and
assigning, by the first base station, a corresponding address to each of the at least one identifier of the second transmission granularity, wherein the second message further carries the identifier that is of the second transmission granularity and that corresponds to each of the at least one address, wherein each of the first transmission granularity and the second transmission granularity is a quality of service (QoS) flow, a protocol data unit (PDU) session, or a data radio bearer (DRB).

3. The method according to claim 1, wherein the first message carries at least one identifier of a second transmission granularity, and the identifier of the second transmission granularity is used to identify the data that corresponds to the identifier of the second transmission granularity and that needs to be sent by the second base station to the first base station; and before the sending, by the first base station, the second message to the second base station, the method further comprises:

assigning, by the first base station, a corresponding address to each of the at least one identifier of the second transmission granularity, wherein the second message carries the identifier that is of the second transmission granularity and that corresponds to each of the at least one address, and wherein a quantity of the at least one identifier of the second transmission granularity is the same as the assigned a quantity of the at least one address.

4. The method according to claim 1, wherein the method further comprises:

receiving, by the first base station, a third message sent by the second base station, wherein the third message carries an identifier that is of a second transmission granularity and that corresponds to each of the at least one address.

5. The method according to claim 2, wherein the first transmission granularity or the second transmission granularity comprises any one of the following: a quality of service QoS flow, a protocol data unit PDU session, and a data radio bearer DRB.

6. A data transmission method, the method comprising:

sending, by a second base station, a first message to a first base station, wherein the first message is used to indicate that the second base station needs to transmit data; and receiving a second message sent by the first base station, wherein the second message carries at least one address that has been assigned by the first station to the data that need to be transmitted by the second station, wherein the at least one address includes an address corresponding to the first base station that is used to identify data transmission through an interface between the first base station and the second base station and that is used by the first base station to identify the data of the second base station, and wherein the data that needs to be transmitted is uplink data that needs to be transmitted to a core network and the second base station is a serving base station to which a user terminal (UE) in a radio resource control (RRC) inactive state is moved from an anchor base station that is the first base station, or wherein the data that need to be transmitted is downlink data that needs to be transmitted to the UE and the first base station is the serving base station and the second base station is the anchor base station, and wherein the first message carries an expected quantity of addresses, and an assigned quantity of the at least one address in the second message is the same as the expected quantity of addresses in the first message.

7. The method according to claim 6, wherein the first message carries at least one identifier of a first transmission granularity, and a mapping relationship between the identifier of the first transmission granularity and an identifier of a second transmission granularity; and the identifier of the first transmission granularity is used to identify the data that corresponds to the identifier of the first transmission granularity and that needs to be sent by the second base station to the first base station; and wherein the second message carries the identifier that is of the second transmission granularity and that corresponds to each of the at least one address, and the assigned quantity of the at least one address in the second message is the same as a quantity of the at least one identifier of the first transmission granularity in the first message, wherein the at least one identifier of the second transmission granularity is determined based on the at least one identifier of the first transmission granularity and the mapping relationship between the identifier of the first transmission granularity and the identifier of the second transmission granularity, wherein each of the first transmission granularity and the second transmission granularity is a quality of service (QoS) flow, a protocol data unit (PDU) session, or a data radio bearer (DRB).

8. The method according to claim 6, wherein the first message carries at least one identifier of a first transmission granularity, and a mapping relationship between the identifier of the first transmission granularity and an identifier of a second transmission granularity; and the identifier of the first transmission granularity is used to identify the data that corresponds to the identifier of the first transmission granularity and that needs to be sent by the second base station to the first base station; and wherein the second message carries the identifier that is of the second transmission granularity and that corresponds to each of the at least one address, and the assigned quantity of the at least one address in the second message is the same as a quantity of the at least one identifier of the second transmission granularity in the first message.

9. The method according to claim 6, wherein the second base station has data that corresponds to the at least one identifier of the second transmission granularity and that needs to be transmitted to the first base station, and wherein the method further comprises:

assigning, by the second base station, the corresponding identifier of the second transmission granularity to each of the at least one address, wherein different addresses correspond to different identifiers of the second transmission granularity; and sending, by the second base station, a third message to the first base station, wherein the third message carries the identifier that is of the second transmission granularity and that corresponds to each of the at least one address.

10. A first base station comprising:

a communications unit; and a processor coupled to the communication unit that is configured to receive a first message sent by a second base station, wherein the first message is used to indicate that the second base station needs to transmit data;

wherein the processor coupled to the communications unit is configured to assign at least one address to the data that need to be transmitted by the second base station, wherein the at least one address includes an address corresponding to the first base station that is used to identify data transmission through an interface between the first base station and the second base station; and wherein the processor coupled to the communications unit is configured to send a second message to the second base station, wherein the second message carries the at least one address, and the at least one address is used by the first base station to identify the data of the second base station, and wherein the data that needs to be transmitted is uplink data that needs to be transmitted to a core network and the second base station is a serving base station to which a user terminal (UE) in a radio resource control (RRC) inactive state is moved from an anchor base station that is the first base station, or wherein the data that need to be transmitted is downlink data that needs to be transmitted to the UE and the first base station is the serving base station and the second base station is the anchor base station, and wherein the first message carries an expected quantity of addresses, and an assigned quantity of the at least one address in the second message is the same as the expected quantity of addresses in the first message.

11. The first base station according to claim 10, wherein the first message carries at least one identifier of a first transmission granularity and a mapping relationship between the identifier of the first transmission granularity and an identifier of a second transmission granularity; wherein the identifier of the first transmission granularity is used to identify the data that corresponds to the identifier of the first transmission granularity and that needs to be sent by the second base station to the first base station; and before that the communications unit is configured to send the second message to the second base station,
wherein the processor is configured to determine at least one identifier of a second transmission granularity based on the at least one identifier of the first transmission granularity and the mapping relationship between the identifier of the first transmission granularity and the identifier of the second transmission granularity; and
the processor is further configured to assign a corresponding address to each of the at least one identifier of the second transmission granularity, and the second message further carries the identifier that is of the second transmission granularity and that corresponds to each of the at least one address, wherein each of the first transmission granularity and the second transmission granularity is a quality of service (QoS) flow, a protocol data unit (PDU) session, or a data radio bearer (DRB).

12. The first base station according to claim 10, wherein the first message carries at least one identifier of a second transmission granularity, and the identifier of the second transmission granularity is used to identify the data that corresponds to the identifier of the second transmission granularity and that needs to be sent by the second base station to the first base station; and before that the communications unit is configured to send the second message to the second base station,
the processor is configured to assign a corresponding address to each of the at least one identifier of the second transmission granularity, the second message further carries the identifier that is of the second transmission granularity and that corresponds to each of the at least one address, and a quantity of the at least one identifier of the second transmission granularity is the same as the assigned quantity of the at least one address.

13. The first base station according to claim 10, wherein the communications unit is further configured to receive a third message sent by the second base station, wherein the third message carries an identifier that is of a second transmission granularity and that corresponds to each of the at least one address.

14. A second base station comprising:
a communications unit; and
a processor coupled to the communications unit that is configured to send a first message to a first base station, wherein the first message is used to indicate that the second base station needs to transmit data; and
wherein the communications unit is configured to receive a second message sent by the first base station, wherein the second message carries at least one address that has been assigned by the first station to the data that need to be transmitted by the second station, wherein the at least one address includes an address corresponding to the first base station that is used to identify data transmission through an interface between the first base station and the second base station and that is used by the first base station to identify the data of the second base station, and wherein the data that needs to be transmitted is uplink data that needs to be transmitted to a core network and the second base station is a serving base station to which a user terminal (UE) in a radio resource control (RRC) inactive state is moved from an anchor base station that is the first base station, or wherein the data that need to be transmitted is downlink data that needs to be transmitted to the UE and the first base station is the serving base station and the second base station is the anchor base station, and wherein the first message carries an expected quantity of addresses, and an assigned quantity of the at least one address in the second message is the same as the expected quantity of addresses in the first message.

15. The second base station according to claim 14, wherein the second base station has data that corresponds to at least one identifier of a second transmission granularity and that needs to be transmitted to the first base station;
wherein the processor is configured to assign a corresponding identifier of the second transmission granularity to each of the at least one address, and different addresses correspond to different identifiers of the second transmission granularity; and
wherein the communications unit is configured to send a third message to the first base station, wherein the third message carries the identifier that is of the second transmission granularity and that corresponds to each of the at least one address, wherein the second transmission granularity is a quality of service (QoS) flow, a protocol data unit (PDU) session, or a data radio bearer (DRB).

* * * * *